US006253334B1

(12) United States Patent
Amdahl et al.

(10) Patent No.: US 6,253,334 B1
(45) Date of Patent: Jun. 26, 2001

(54) THREE BUS SERVER ARCHITECTURE WITH A LEGACY PCI BUS AND MIRRORED I/O PCI BUSES

(75) Inventors: Carlton G. Amdahl; Dennis H. Smith, both of Fremont; Don A. Agneta, Morgan Hill, all of CA (US)

(73) Assignee: Micron Electronics, Inc., Nampa, ID (US)

(*) Notice: Subject to any disclaimer, the term of this patent is extended or adjusted under 35 U.S.C. 154(b) by 0 days.

(21) Appl. No.: 08/941,995

(22) Filed: Oct. 1, 1997

Related U.S. Application Data

(60) Provisional application No. 60/046,490, filed on May 13, 1997, and provisional application No. 60/046,491, filed on May 13, 1997.

(51) Int. Cl.[7] ........................................................ G06F 11/16

(52) U.S. Cl. ............................ 714/4; 714/43; 710/128; 710/101; 710/102; 709/105; 709/239

(58) Field of Search ................................. 710/128, 100, 710/101, 126, 129, 131, 2, 17, 102; 714/4, 7, 6, 8, 43–44; 709/105, 230, 238, 239, 250, 251, 253

(56) References Cited

U.S. PATENT DOCUMENTS

| 4,057,847 | 11/1977 | Lowell et al. | 364/200 |
|---|---|---|---|
| 4,100,597 | 7/1978 | Fleming et al. | 364/474 |
| 4,449,182 | 5/1984 | Rubinson et al. | |
| 4,672,535 | 6/1987 | Katzman et al. | 364/200 |
| 4,692,918 | 9/1987 | Elliott et al. | 370/85 |
| 4,695,946 | 9/1987 | Andreasen et al. | 364/200 |
| 4,707,803 | 11/1987 | Anthony, Jr. et al. | |

(List continued on next page.)

FOREIGN PATENT DOCUMENTS

| 0 866 403 A1 | 9/1998 | (EP) | |
|---|---|---|---|
| 04 333 118 | 11/1992 | (JP) | G06F/1/18 |
| 05 233 110 | 9/1993 | (JP) | G06F/3/00 |
| 07 093 064 | 4/1995 | (JP) | G06F/1/26 |
| 07 261 874 | 10/1995 | (JP) | G06F/1/18 |

OTHER PUBLICATIONS

Lyons, Computer Reseller News, Issue 721, pp. 61–62, Feb. 3, 1997, "ACC Releases Low–Cost Solution for ISPs.".

(List continued on next page.)

*Primary Examiner*—Robert W. Beausoliel, Jr.
*Assistant Examiner*—Scott T. Baderman
(74) *Attorney, Agent, or Firm*—Knobbe, Martens, Olson & Bear LLP

(57) ABSTRACT

A fault-tolerant computer system includes a processor and a memory, connected to a system bus. The system includes at least two mirrored circuits, at least two mirrored IO devices, a detection means and a re-route means. The two mirrored circuits each include an interface to the system bus, and an IO interface. The input/output interface of each of the mirrored circuits is connected to one of the two mirrored IO devices. Detection means detect a load imbalance in the data transfer between the system bus and either one of the two mirrored IO devices. In response to the detection of a load imbalance, the re-route means re-routes the data transfer between the system bus and the other one of the two mirrored IO devices. In another embodiment, a fault-tolerant computer system includes a first, second and third IO bus, legacy devices, and two IO devices. The first IO bus is connected to the system bus. The legacy devices are connected to the first IO bus. The second and third IO buses are each connected to the system bus. The IO devices are each connected to a corresponding one of the second and third IO buses. An other embodiment of the invention can be characterized as an apparatus for transferring data between at least one transport protocol stack and a plurality of network adapters coupled to a computer network that supports recovery from network adapter and a connection failure.

18 Claims, 14 Drawing Sheets

U.S. PATENT DOCUMENTS

| | | | |
|---|---|---|---|
| 4,769,764 | 9/1988 | Levanon | 364/708 |
| 4,774,502 | 9/1988 | Kimura | 340/501 |
| 4,821,180 | 4/1989 | Gerety et al. | 364/200 |
| 4,835,737 | 5/1989 | Herrig et al. . | |
| 4,894,792 | 1/1990 | Mitchell et al. | 364/708 |
| 4,949,245 | 8/1990 | Martin et al. . | |
| 4,968,977 | 11/1990 | Chinnaswamy et al. | 340/825.8 |
| 4,999,787 | 3/1991 | McNally et al. . | |
| 5,006,961 | 4/1991 | Monico . | |
| 5,007,431 | 4/1991 | Donehoo, III | 128/696 |
| 5,033,048 | 7/1991 | Pierce et al. | 371/21.2 |
| 5,051,720 | 9/1991 | Kittirutsunetorn | 340/310 R |
| 5,073,932 | 12/1991 | Yossifor et al. | 380/23 |
| 5,103,391 | 4/1992 | Barrett | 364/133 |
| 5,118,970 | 6/1992 | Olson et al. | 307/443 |
| 5,121,500 | 6/1992 | Arlington et al. | 395/750 |
| 5,123,017 | 6/1992 | Simpkins et al. | 371/15.1 |
| 5,136,708 | 8/1992 | Lapourtre et al. | 395/650 |
| 5,136,715 | 8/1992 | Hirose et al. | 395/775 |
| 5,138,619 | 8/1992 | Fasang et al. | 371/21.1 |
| 5,157,663 | 10/1992 | Major et al. | 371/9.1 |
| 5,210,855 | 5/1993 | Bartol | 395/500 |
| 5,245,615 | 9/1993 | Treu | 371/16.5 |
| 5,247,683 | 9/1993 | Holmes et al. | 395/700 |
| 5,253,348 | 10/1993 | Scalise | 395/325 |
| 5,261,094 | 11/1993 | Everson et al. | 395/600 |
| 5,265,098 * | 11/1993 | Mattson et al. | 371/11.1 |
| 5,266,838 | 11/1993 | Gerner | 307/19 |
| 5,269,011 | 12/1993 | Yanai et al. . | |
| 5,272,382 | 12/1993 | Heald et al. | 307/66 |
| 5,272,584 | 12/1993 | Austruy et al. | 631/58 |
| 5,276,863 | 1/1994 | Heider | 395/575 |
| 5,277,615 | 1/1994 | Hastings et al. | 439/377 |
| 5,280,621 | 1/1994 | Barnes et al. | 395/800 |
| 5,283,905 | 2/1994 | Saadeh et al. | 395/750 |
| 5,307,354 | 4/1994 | Cramer et al. . | |
| 5,311,397 | 5/1994 | Harshberger et al. | 361/683 |
| 5,311,451 | 5/1994 | Barrett | 364/550 |
| 5,317,693 | 5/1994 | Cuenod et al. . | |
| 5,329,625 | 7/1994 | Kannan et al. . | |
| 5,337,413 | 8/1994 | Lui et al. | 395/275 |
| 5,351,276 | 9/1994 | Doll, Jr. et al. . | |
| 5,367,670 | 11/1994 | Ward et al. | 395/575 |
| 5,379,184 | 1/1995 | Barraza et al. | 361/685 |
| 5,379,409 | 1/1995 | Ishikawa | 395/575 |
| 5,386,567 | 1/1995 | Lien et al. | 395/700 |
| 5,388,267 | 2/1995 | Chan et al. | 395/700 |
| 5,402,431 | 3/1995 | Saadeh et al. | 371/67.1 |
| 5,404,494 | 4/1995 | Garney . | |
| 5,423,025 | 6/1995 | Goldman et al. | 395/575 |
| 5,426,740 | 6/1995 | Bennett | 395/325 |
| 5,430,717 | 7/1995 | Fowler et al. | 370/58.2 |
| 5,430,845 | 7/1995 | Rimmer et al. | 395/275 |
| 5,432,715 | 7/1995 | Shigematsu et al. | 364/551.01 |
| 5,432,946 | 7/1995 | Allard et al. | 395/750 |
| 5,438,678 | 8/1995 | Smith | 395/750 |
| 5,440,748 | 8/1995 | Sekine et al. . | |
| 5,448,723 | 9/1995 | Rowett | 395/200.02 |
| 5,455,933 | 10/1995 | Schieve et al. | 395/183.03 |
| 5,460,441 | 10/1995 | Hastings et al. | 312/298 |
| 5,463,766 | 10/1995 | Schieve et al. | 395/650 |
| 5,465,349 | 11/1995 | Geronimi et al. | 364/550 |
| 5,471,617 | 11/1995 | Farrand et al. | 395/700 |
| 5,471,634 | 11/1995 | Giorgio et al. | 395/600 |
| 5,473,499 | 12/1995 | Weir | 361/58 |
| 5,483,419 | 1/1996 | Kaczeus, Sr. et al. . | |
| 5,485,550 | 1/1996 | Dalton | 395/51 |
| 5,485,607 | 1/1996 | Lomet et al. | 395/600 |
| 5,487,148 | 1/1996 | Komori et al. . | |
| 5,490,252 * | 2/1996 | Macera et al. | 395/200.01 |
| 5,491,791 | 2/1996 | Glowny et al. . | |
| 5,493,574 | 2/1996 | McKinley . | |
| 5,493,666 | 2/1996 | Fitch . | |
| 5,513,314 | 4/1996 | Kandasamy et al. | 395/182.04 |
| 5,513,339 | 4/1996 | Agrawal et al. | 395/500 |
| 5,517,646 | 5/1996 | Piccirillo et al. . | |
| 5,519,851 | 5/1996 | Bender et al. | 395/500 |
| 5,526,289 | 6/1996 | Dinh et al. | 364/557 |
| 5,528,409 | 6/1996 | Cucci et al. | 359/171 |
| 5,530,810 | 6/1996 | Bowman | 395/283 |
| 5,533,193 | 7/1996 | Roscoe | 395/183.15 |
| 5,533,198 | 7/1996 | Thorson | 395/200.15 |
| 5,535,326 | 7/1996 | Baskey et al. | 395/182.02 |
| 5,539,883 | 7/1996 | Allon et al. | 395/200.11 |
| 5,542,055 | 7/1996 | Amini et al. | 395/281 |
| 5,546,272 | 8/1996 | Moss et al. | 361/687 |
| 5,548,712 | 8/1996 | Larson et al. | 395/182.05 |
| 5,555,510 | 9/1996 | Verseput et al. . | |
| 5,559,764 * | 9/1996 | Chen et al. | 369/30 |
| 5,559,958 | 9/1996 | Farrand et al. | 395/183.03 |
| 5,559,965 | 9/1996 | Oztaskin et al. . | |
| 5,560,022 | 9/1996 | Dunstan et al. | 395/750 |
| 5,564,024 | 10/1996 | Pemberton | 395/283 |
| 5,566,299 | 10/1996 | Billings et al. | 395/182.02 |
| 5,566,339 | 10/1996 | Perholtz et al. | 395/750 |
| 5,568,610 | 10/1996 | Brown . | |
| 5,568,619 | 10/1996 | Blackledge et al. . | |
| 5,572,403 | 11/1996 | Mills | 361/695 |
| 5,577,205 | 11/1996 | Hwang et al. . | |
| 5,579,487 | 11/1996 | Meyerson et al. | 395/280 |
| 5,579,491 | 11/1996 | Jeffries et al. | 395/283 |
| 5,579,528 | 11/1996 | Register | 395/671 |
| 5,581,712 | 12/1996 | Herrman . | |
| 5,581,714 | 12/1996 | Amini et al. . | |
| 5,584,030 | 12/1996 | Husak et al. | 395/750 |
| 5,586,250 | 12/1996 | Carbonneau et al. | 395/183.2 |
| 5,588,121 * | 12/1996 | Reddin et al. | 395/200.15 |
| 5,588,144 | 12/1996 | Inoue et al. . | |
| 5,592,610 | 1/1997 | Chittor | 395/182.02 |
| 5,592,611 | 1/1997 | Midgley et al. | 395/182.02 |
| 5,596,711 | 1/1997 | Burckhartt et al. | 395/182.21 |
| 5,598,407 | 1/1997 | Bud et al. | 370/330 |
| 5,602,758 | 2/1997 | Lincoln et al. | 364/505 |
| 5,604,873 | 2/1997 | Fite et al. | 395/283 |
| 5,606,672 | 2/1997 | Wade . | |
| 5,608,865 | 3/1997 | Midgley et al. | 395/180 |
| 5,608,876 | 3/1997 | Cohen et al. | 395/281 |
| 5,615,207 | 3/1997 | Gephardt et al. . | |
| 5,621,159 | 4/1997 | Brown et al. | 73/9 |
| 5,621,892 | 4/1997 | Cook | 395/200.1 |
| 5,622,221 | 4/1997 | Genga, Jr. et al. | 165/208 |
| 5,625,238 | 4/1997 | Ady et al. | 307/147 |
| 5,627,962 | 5/1997 | Goodrum et al. | 395/182.11 |
| 5,628,028 | 5/1997 | Michelson | 395/825 |
| 5,630,076 | 5/1997 | Saulpaugh et al. | 395/284 |
| 5,631,847 | 5/1997 | Kikinis | 364/514 R |
| 5,632,021 | 5/1997 | Jennings et al. | 395/309 |
| 5,636,341 | 6/1997 | Matsushita et al. | 395/182.11 |
| 5,638,289 | 6/1997 | Yamada et al. | 364/489 |
| 5,644,470 | 7/1997 | Benedict et al. . | |
| 5,644,731 | 7/1997 | Liencres et al. | 395/283 |
| 5,651,006 | 7/1997 | Fujino et al. . | |
| 5,652,832 | 7/1997 | Kane et al. . | |
| 5,652,833 | 7/1997 | Takizawa et al. | 395/182.08 |
| 5,652,839 | 7/1997 | Giorgio et al. | 395/200.11 |
| 5,652,892 | 7/1997 | Ugajin | 395/750 |
| 5,652,908 | 7/1997 | Douglas et al. | 395/800 |
| 5,655,081 | 8/1997 | Bonnell et al. . | |
| 5,655,083 | 8/1997 | Bagley | 395/182.31 |
| 5,655,148 | 8/1997 | Richman et al. . | |
| 5,659,682 | 8/1997 | Devarakonda et al. . | |

| | | | |
|---|---|---|---|
| 5,664,118 | 9/1997 | Nishigaki et al. ............... 395/283 |
| 5,664,119 | 9/1997 | Jeffries et al. . |
| 5,666,538 | 9/1997 | DeNicola . |
| 5,668,943 | 9/1997 | Attanasio et al. ........... 395/182.05 |
| 5,668,992 | 9/1997 | Hammer et al. .................. 395/651 |
| 5,669,009 | 9/1997 | Buktenica et al. ........... 395/800.35 |
| 5,671,371 * | 9/1997 | Kondo et al. ..................... 395/306 |
| 5,675,723 | 10/1997 | Ekrot et al. . |
| 5,680,288 | 10/1997 | Carey et al. . |
| 5,682,328 | 10/1997 | Roeber et al. ................... 364/550 |
| 5,684,671 | 11/1997 | Hobbs et al. . |
| 5,689,637 | 11/1997 | Johnson et al. . |
| 5,696,895 | 12/1997 | Hemphill et al. ............ 395/182.02 |
| 5,696,899 | 12/1997 | Kalwitz . |
| 5,696,949 | 12/1997 | Young ............................... 395/551 |
| 5,696,970 | 12/1997 | Sandage et al. . |
| 5,701,417 | 12/1997 | Lewis et al. .................. 395/200.16 |
| 5,704,031 | 12/1997 | Mikami et al. .............. 395/182.02 |
| 5,708,775 | 1/1998 | Nakamura .................... 395/185.01 |
| 5,708,776 | 1/1998 | Kikinis ......................... 395/185.08 |
| 5,712,754 | 1/1998 | Sides et al. ......................... 361/58 |
| 5,715,456 | 2/1998 | Bennett et al. ................... 395/652 |
| 5,717,570 | 2/1998 | Kikinis ............................... 361/685 |
| 5,721,935 | 2/1998 | DeSchepper et al. ........... 395/750 |
| 5,724,529 | 3/1998 | Smith et al. . |
| 5,726,506 | 3/1998 | Wood . |
| 5,727,207 | 3/1998 | Gates et al. ....................... 395/651 |
| 5,729,767 * | 3/1998 | Jones et al. ....................... 395/882 |
| 5,732,266 | 3/1998 | Moore et al. ..................... 395/651 |
| 5,737,708 | 4/1998 | Grob et al. ........................ 455/557 |
| 5,737,747 | 4/1998 | Vishlitzky et al. ............... 711/118 |
| 5,740,378 | 4/1998 | Rehl et al. . |
| 5,742,514 | 4/1998 | Bonola ............................... 364/492 |
| 5,742,833 | 4/1998 | Dea et al. .................... 395/750.05 |
| 5,747,889 | 5/1998 | Raynham et al. . |
| 5,748,426 | 5/1998 | Bedingfield et al. . |
| 5,752,164 | 5/1998 | Jones ................................. 455/33.1 |
| 5,754,797 | 5/1998 | Takahashi . |
| 5,758,165 | 5/1998 | Shuff ................................... 395/712 |
| 5,758,352 | 5/1998 | Reynolds et al. ................. 707/200 |
| 5,761,033 | 6/1998 | Wilhelm . |
| 5,761,045 | 6/1998 | Olson et al. . |
| 5,761,085 | 6/1998 | Giorgio ............................... 364/505 |
| 5,761,462 | 6/1998 | Neal et al. . |
| 5,761,707 | 6/1998 | Aiken et al. ....................... 711/118 |
| 5,764,924 | 6/1998 | Hong .................................. 395/281 |
| 5,764,968 | 6/1998 | Ninomiya . |
| 5,765,008 | 6/1998 | Desai et al. . |
| 5,765,198 | 6/1998 | McCrocklin et al. . |
| 5,767,844 | 6/1998 | Stoye .................................. 345/212 |
| 5,768,541 | 6/1998 | Pan-Ratzlaff . |
| 5,768,542 | 6/1998 | Enstrom et al. . |
| 5,771,343 | 6/1998 | Hafner et al. ................ 395/182.02 |
| 5,774,640 | 6/1998 | Kurio ............................ 395/182.02 |
| 5,774,645 | 6/1998 | Beaujard et al. ............. 395/183.01 |
| 5,774,741 | 6/1998 | Choi . |
| 5,777,897 | 7/1998 | Giorgio ............................... 364/557 |
| 5,778,197 | 7/1998 | Dunham ............................. 395/284 |
| 5,781,703 | 7/1998 | Desai et al. . |
| 5,781,716 | 7/1998 | Hemphill et al. ............ 395/182.02 |
| 5,781,744 | 7/1998 | Johnson et al. ................... 395/283 |
| 5,781,767 | 7/1998 | Inoue et al. . |
| 5,781,798 | 7/1998 | Beatty et al. . |
| 5,784,555 | 7/1998 | Stone .............................. 395/200.5 |
| 5,784,576 | 7/1998 | Guthrie et al. . |
| 5,787,019 | 7/1998 | Knight et al. ..................... 364/550 |
| 5,787,459 * | 7/1998 | Stallmo et al. .................... 711/112 |
| 5,787,491 | 7/1998 | Merkin et al. .................... 711/173 |
| 5,790,775 | 8/1998 | Marks et al. ................. 395/182.07 |
| 5,790,831 | 8/1998 | Lin et al. . |
| 5,793,948 | 8/1998 | Asahi et al. .................. 395/184.01 |
| 5,793,987 | 8/1998 | Quackenbush et al. . |
| 5,793,992 | 8/1998 | Steele et al. ....................... 395/293 |
| 5,794,035 | 8/1998 | Golub et al. . |
| 5,796,185 | 8/1998 | Takata et al. . |
| 5,796,580 | 8/1998 | Komatsu et al. ................. 361/687 |
| 5,796,934 | 8/1998 | Bhanot et al. ................ 395/182.02 |
| 5,796,981 | 8/1998 | Abudayyeh et al. . |
| 5,797,023 | 8/1998 | Berman et al. ............. 395/750.06 |
| 5,798,828 | 8/1998 | Thomas et al. . |
| 5,799,036 | 8/1998 | Staples . |
| 5,799,196 | 8/1998 | Flannery ...................... 395/750.03 |
| 5,801,921 | 9/1998 | Miller . |
| 5,802,269 | 9/1998 | Poisner et al. . |
| 5,802,298 | 9/1998 | Imai et al. ................... 395/200.47 |
| 5,802,305 | 9/1998 | McKaughan et al. ....... 395/200.57 |
| 5,802,324 | 9/1998 | Wunderlich et al. ............ 395/281 |
| 5,802,393 | 9/1998 | Begun et al. . |
| 5,802,552 | 9/1998 | Fandrich et al. . |
| 5,802,592 | 9/1998 | Chess et al. ....................... 711/164 |
| 5,803,357 | 9/1998 | Lakin ................................. 236/78 B |
| 5,805,804 | 9/1998 | Laursen et al. .............. 395/200.02 |
| 5,805,834 | 9/1998 | McKinley et al. . |
| 5,809,224 | 9/1998 | Schultz et al. . |
| 5,809,256 | 9/1998 | Najemy ............................. 395/283 |
| 5,809,287 | 9/1998 | Stupek, Jr. et al. ............. 395/500 |
| 5,809,311 | 9/1998 | Jones ............................. 395/750.01 |
| 5,809,555 | 9/1998 | Hobson ............................. 711/172 |
| 5,812,748 | 9/1998 | Ohran et al. ................. 395/182.02 |
| 5,812,750 | 9/1998 | Dev et al. . |
| 5,812,757 | 9/1998 | Okamoto et al. . |
| 5,812,858 | 9/1998 | Nookala et al. . |
| 5,815,117 | 9/1998 | Kolanek . |
| 5,815,647 | 9/1998 | Buckland et al. ........... 395/182.01 |
| 5,815,651 | 9/1998 | Litt ................................ 395/182.08 |
| 5,815,652 | 9/1998 | Ote et al. . |
| 5,821,596 | 10/1998 | Miu et al. .......................... 257/419 |
| 5,822,547 | 10/1998 | Boesch et al. . |
| 5,826,043 | 10/1998 | Smith et al. ....................... 395/281 |
| 5,829,046 | 10/1998 | Tzelnic et al. .................... 711/162 |
| 5,835,719 | 11/1998 | Gibson et al. ................ 395/200.51 |
| 5,835,738 | 11/1998 | Blackledge, Jr. et al. . |
| 5,838,932 | 11/1998 | Alzien ................................ 395/308 |
| 5,838,935 | 11/1998 | Davis et al. ....................... 395/309 |
| 5,841,964 | 11/1998 | Yamaguchi ................... 395/113.21 |
| 5,841,991 | 11/1998 | Russell . |
| 5,845,061 | 12/1998 | Miyamoto et al. .......... 395/182.02 |
| 5,845,095 | 12/1998 | Reed et al. ........................ 395/283 |
| 5,850,546 | 12/1998 | Kim .................................... 395/651 |
| 5,852,720 | 12/1998 | Gready et al. . |
| 5,852,724 | 12/1998 | Glenn, II et al. ............ 395/200.69 |
| 5,857,074 | 1/1999 | Johnson . |
| 5,857,102 | 1/1999 | McChesney et al. ............ 395/653 |
| 5,864,653 * | 1/1999 | Tavallaei et al. ................. 315/181 |
| 5,864,654 | 1/1999 | Marchant ...................... 395/182.01 |
| 5,864,713 | 1/1999 | Terry ................................... 395/872 |
| 5,867,730 | 2/1999 | Leyda ................................ 395/830 |
| 5,875,307 | 2/1999 | Ma et al. ........................... 395/281 |
| 5,875,308 | 2/1999 | Egan et al. ........................ 395/283 |
| 5,875,310 | 2/1999 | Buckland et al. ................ 395/306 |
| 5,878,237 | 3/1999 | Olarig ................................ 395/308 |
| 5,878,238 | 3/1999 | Gan et al. .......................... 395/308 |
| 5,881,311 * | 3/1999 | Woods ................................ 395/824 |
| 5,884,027 | 3/1999 | Garbus et al. ................. 395/200.8 |
| 5,884,049 | 3/1999 | Atkinson ........................... 395/281 |
| 5,886,424 | 3/1999 | Kim ...................................... 307/64 |
| 5,889,965 | 3/1999 | Wallach et al. ................... 395/283 |
| 5,892,898 | 4/1999 | Fujii et al. ....................... 395/185.1 |
| 5,892,915 | 4/1999 | Duso et al. ................... 395/200.49 |
| 5,892,928 | 4/1999 | Wallach et al. ................... 395/283 |
| 5,893,140 | 4/1999 | Vahalia et al. .................... 711/118 |
| 5,898,846 | 4/1999 | Kelly .................................. 395/284 |

| | | | |
|---|---|---|---|
| 5,898,888 | 4/1999 | Guthrie et al. | 395/308 |
| 5,905,867 | 5/1999 | Giorgio | 395/200.54 |
| 5,907,672 | 5/1999 | Matze et al. | 395/182.06 |
| 5,909,568 | 6/1999 | Nason | 395/500 |
| 5,911,779 * | 6/1999 | Stallmo et al. | 714/6 |
| 5,913,034 | 6/1999 | Malcolm | 395/200.53 |
| 5,918,057 | 6/1999 | Chou et al. | 395/733 |
| 5,922,060 | 7/1999 | Goodrum | 710/103 |
| 5,923,854 * | 7/1999 | Bell et al. | 395/200.73 |
| 5,930,358 | 7/1999 | Rao | 380/4 |
| 5,935,262 | 8/1999 | Barrett et al. | 714/46 |
| 5,936,960 | 8/1999 | Stewart | 370/438 |
| 5,938,751 | 8/1999 | Tavallaei et al. | 710/103 |
| 5,941,996 | 8/1999 | Smith et al. | 714/47 |
| 5,964,855 | 10/1999 | Bass et al. | 710/103 |
| 5,983,349 | 11/1999 | Kodama et al. | 713/200 |
| 5,987,554 | 11/1999 | Liu et al. | 710/129 |
| 5,987,621 | 11/1999 | Duso et al. | 714/4 |
| 5,987,627 | 11/1999 | Rawlings, III | 714/48 |
| 6,012,130 | 1/2000 | Beyda et al. | 711/173 |

OTHER PUBLICATIONS

M2 Communications, M2 Presswire, 2 pages, Dec. 19, 1996, "Novell IntranetWare Supports Hot Pluggable PCI from NetFRAME.".

Rigney, PC Magazine, 14(17): 375–379, Oct. 10, 1995, "The One for the Road (Mobile–aware capabilities in Windows 95).".

Shanley, and Anderson, PCI System Architecture, Third Edition, p. 382, Copyright 1995.

ftp.cdrom.com/pub/os2/diskutil/, PHDX software, phdx.zip download, Mar. 1995, "Parallel Hard Disk Xfer.".

Cmasters, Usenet post to microsoft.public.windowsnt.setup, Aug. 1997, "Re: FDISK switches.".

Hildebrand, N., Usenet post to comp.msdos.programmer, May 1995, "Re: Structure of disk partition into.".

Lewis, L., Usenet post to alt.msdos.batch, Apr. 1997, "Re: Need help with automating FDISK and FORMAT.".

Netframe, http://www.netframe–support.com/technology/datasheets/data.htm, before Mar. 1997, "Netframe Cluster-System 9008 Data Sheet.".

Simos, M., Usenet post to comp.os.msdos.misc, Apr. 1997, "Re: Auto FDISK and FORMAT.".

Wood, M. H., Usenet post to comp.os.netware.misc, Aug. 1996, "Re: Workstation duplication method for WIN95.".

Gorlick, M., Conf. Proceedings: ACM/ONR Workshop on Parallel and Distribution Debugging, pp. 175–181, 1991, "The Flight Recorder: An Architectural Aid for System Monitoring.".

IBM Technical Disclosure Bulletin, 92A+62947, pp. 391–394, Oct. 1992, Method for Card Hot Plug Detection and Control.

Davis, T, Usenet post to alt.msdos.programmer, Apr. 1997, "Re: How do I create an FDISK batch file?".

Davis, T., Usenet post to alt.msdos.batch, Apr. 1997, "Re: Need help with automating FDISK and FORMAT . . . ".

NetFrame Systems Incorporated, Doc. No. 78–1000226–01, pp. 1–2, 5–8, 359–404, and 471–512, Apr. 1996, "NetFrame Clustered Multiprocessing Software: NW0496 DC–ROM for Novel® NetWare® 4.1 SMP, 4.1, and 3.12.".

Shanley, and Anderson, PCI System Architecture, Third Edition, Chapter 15, pp. 297–302, Copyright 1995, "Intro To Configuration Address Space.".

Shanley, and Anderson, PCI System Architecture, Third Edition, Chapter 16, pp. 303–328, Copyright 1995, "Configuration Transactions.".

Sun Microsystems Computer Company, Part No. 802–5355–10, Rev. A, May 1996, "Solstice SyMON User's Guid.".

Sun Microsystems, Part No. 802–6569–11, Release 1.0.1, Nov. 1996, "Remote Systems Diagnostics Installation & User Guide.".

PCI Hot–Plug Specification, Preliminary Revision for Review Only, Revision 0.9, pp. i–vi, and 1–25, Mar. 5, 1997.

SES SCSI–3 Enclosure Services, X3T10/Project 1212–D/Rev 8a, pp. i, iii–x, 1–76, and I–1 (index), Jan. 16, 1997.

Compaq Computer Corporation, Technology Brief, pp. 1–13, Dec. 1996, "Where Do I Plug the Cable? Solving the Logical–Physical Slot Numbering Problem.".

Standard Overview, http://www.pc–card.com/stand_overview.html#1, 9 pages, Jun. 1990, "Detailed Overview of the PC Card Standard.".

Digital Equipment Corporation, *datasheet*, 140 pages, 1993, "DECchip 21050 PCI–TO–PCI Bridge.".

NetFRAME Systems Incorporated, *News Release*, 3 pages, referring to May 9, 1994, "NetFRAME's New High–Availability ClusterServer Systems Avoid Scheduled as well as Unscheduled Downtime.".

Compaq Computer Corporation, Phenix Technologies, LTD, and Intel Corporation, *specification*, 55 pages, May 5, 1994, "Plug & Play BIOS Specification.".

NetFRAME Systems Incorporated, *datasheet*, 2 pages, Feb. 1996, "NF450FT Network Mainframe.".

NetFRAME Systems Incorporated, *datasheet*, 9 pages, Mar. 1996, "NetFRAME Cluster Server 8000.".

Joint work by Intel Corporation, Compaq, Adaptec, Hewlett Packard, and Novell, *presentation*, 22 pages, Jun. 1996, "Intelligent I/O Architecture.".

Lockareff, M., HTINews, http://www.hometoys.com/htinews/dec96/articles/Ionworks.htm, 2 pages, Dec. 1996, "Loneworks—An Introduction.".

Schofield, M.J., http://www.omegas.co.uk/CAN/canworks.htm, 4 pages, Copyright 1996, 1997, "Controller Area Network—How CAN Works.".

NTRR, Ltd, http://www.nrtt.demon.co.uk/cantech.html, 5 pages, May 28, 1997, "CAN: Technical Overview.".

Herr, et al., Linear Technology Magazine, *Design Features*, pp. 21–23, Jun. 1997, "Hot Swapping the PCI Bus.".

PCI Special Interest Group, *specification*, 35 pages, Draft For Review Only, Jun. 15, 1997, "PCI Bus Hot Plug Specification.".

Microsoft Corporation, file:///A|/Rem_devs.htm, 4 pages, Copyright 1997, updated Aug. 13, 1997, "Supporting Removable Devices Under Windows and Windows NT.".

Haban, D. & D. Wybranietz, *IEEE Transaction on Software Engineering*, 16(2):197–211, Feb. 1990, "A Hybrid Monitor for Behavior and Performance Analysis of Distributed Systems."

* cited by examiner

| 700 DESTINATION ADDRESS | 702 SOURCE ADDRESS | 704 PACKET TYPE | 706 ADAPTER ID |
|---|---|---|---|

*FIG. 5*

| 800 ACS CTL | 802 FRM CTL | 804 DESTINATION ADDRESS | 806 SOURCE ADDRESS | 808 DSAP | 810 SSAP | 812 CTL | 814 PROTOCOL | 816 PACKET TYPE | 818 ADAPTER ID |
|---|---|---|---|---|---|---|---|---|---|

*FIG. 6*

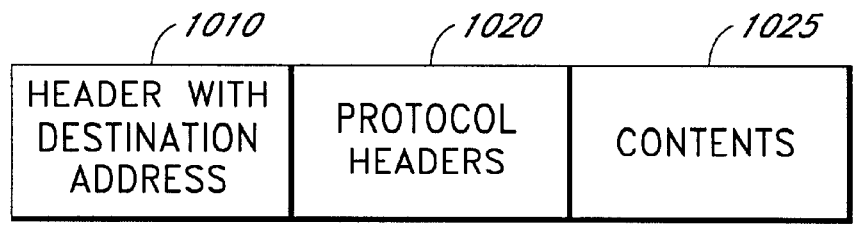
FIG. 8
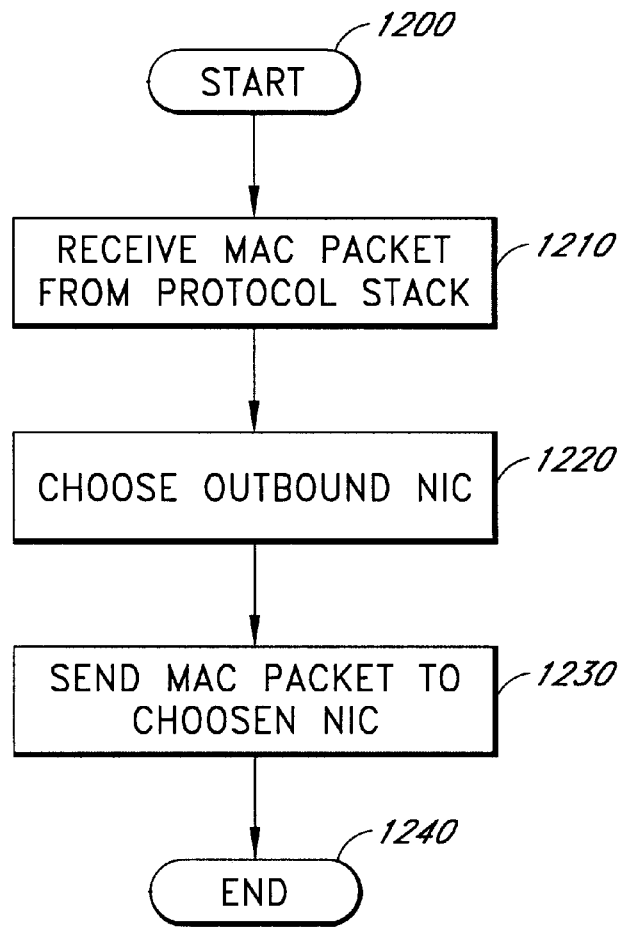
FIG. 10

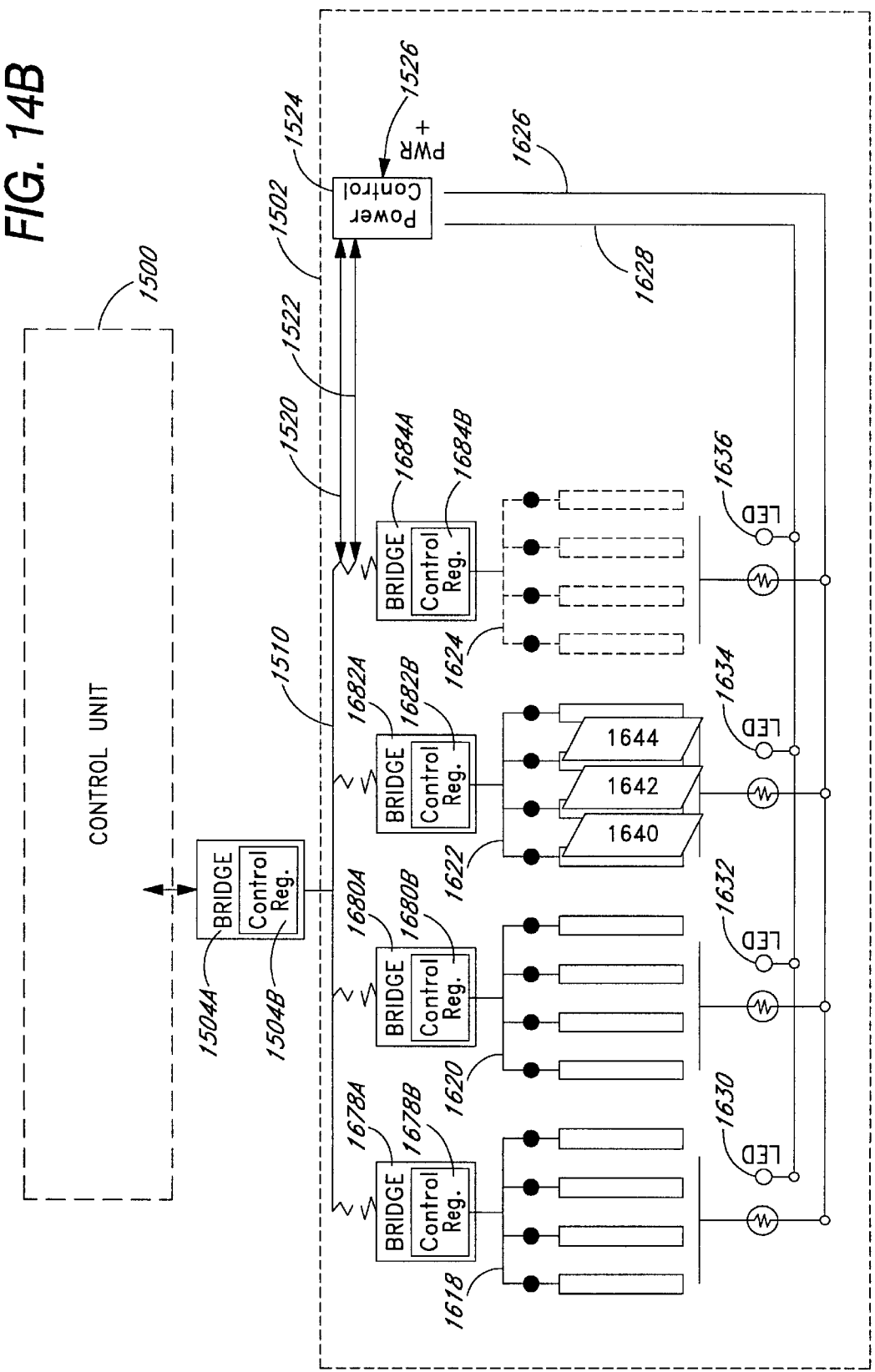

THREE BUS SERVER ARCHITECTURE WITH A LEGACY PCI BUS AND MIRRORED I/O PCI BUSES

PRIORITY

The benefit under 35 U.S.C. § 119(e) of the following U.S. Provisional Application entitled, "Three Bus Server Architecture With A Legacy PCI Bus and Mirrored I/O PCI Buses," as application Ser. No. 60/046,490, filed on May 13, 1997, and U.S. Provisional Application entitled, Means For Allowing Two Or More Network Interface Controller Cards To Appear as One Card To An Operating System," Ser. No. 60/046,491, filed on May 13, 1997, are hereby claimed.

RELATED APPLICATION

The subject matter of U.S. Application entitled "Means For Allowing Two Or More Network Interface Controller Cards To Appear As One Card To An Operating System," filed on Oct. 1, 1997, application Ser. No. 08/943,379, and is related to this application.

Appendices

Appendix A, which forms a part of this disclosure, is a list of commonly owned copending U.S. Patent applications. Each one of the applications listed in Appendix A is hereby incorporated herein in its entirety by reference thereto.

Appendix B, which forms part of this disclosure, is a copy of the U.S. provisional patent application filed May 13, 1997, entitled "Three Bus Server Architecture With A Legacy PCI Bus and Mirrored I/O PCI Buses," and assigned application Ser. No. 60/046,490.

Copyright Authorization

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates to a system for enhancing the performance of a a computational server connected to both data storage devices and networks, and more particularly to a system that provides load balancing and fault tolerance capabilities.

2. Related Art

Personal computers (PCs) have undergone evolutionary changes since the original models based on the Intel 8088 microprocessor, such as the International Business Machine Corporation (IBM) PC and other IBM-compatible machines. As the popularity of PCs have grown, so has the demand for more advanced features and increased capability, reliability and speed. Higher order microprocessors such as the Intel 20286, 30386, 40486, and more recently, the Pentium® series have been developed. The speed of the fastest of these processors, the Pentium® II series is 266 MHz as opposed to the 8 MHz clock speed for the 8088 microprocessor.

Faster bus architectures have been developed to support the higher processor speeds. Modern computer systems typically include one or more processors coupled through a system bus to main memory. The system bus also typically couples to a high bandwidth expansion bus, such as the Peripheral Component Interconnect (PCI) bus which operates at 33 or 66 MHz. High speed devices such as small computer systems interface (SCSI) adapters, network interface cards (NIC), video adapters, etc. can be coupled to a PCI bus. An older type low bandwidth bus such as the Industry Standard Architecture (ISA), also referred to as the AT bus, is generally coupled to the system bus as well. This bus operates at 6 MHz. To the ISA bus are attached various low speed devices such as keyboard, monitor, Basic Input/Output System (BIOS) and parallel and communications ports. These devices are known as legacy devices because they trace their lineage, their legacy, back to the initial PC architecture introduced by IBM in 1982:

With the enhanced processor and bus speeds the PC now is utilized to perform as a server, and to provide high speed data transfers between, for example, a network and a storage device. There are, however, several constraints inherent in the current PC architecture, which limit its performance as a server. First, the legacy devices and the high speed devices compete for limited bus bandwidth, and thereby degrade system performance. Second, whereas the original PC operated as a standalone and did not affect other PCs when there was a system failure, the PC/Server must be able to maintain operation despite failure of individual components. The PC/Server must, in other words, be fault-tolerant, i.e. able to maintain operation despite the failure of individual components.

What is needed is a way to move the PC from a standalone model to a server model. In doing so, the inherant conflict of high and low bandwidth buses must be resolved, fault-tolerance must be provided, and throughput should be enhanced.

SUMMARY

An embodiment of the present invention provides a fault-tolerant computer system with a processor and a memory, connected to a system bus. The system includes at least two mirrored circuits, at least two mirrored input/output devices, a detection means and a re-route means. The two mirrored circuits each include an interface to the system bus, and an input/output interface. The input/output interface of each of the mirrored circuits is connected to one of the two mirrored input/output devices. Detection means detect a load imbalance in the data transfer between the system bus and either one of the two mirrored IO devices. In response the re-route means, re-routes the data transfer between the system bus and the other one of the two mirrored IO devices.

In another embodiment, a fault-tolerant computer system includes a first, second and third input/output (IO) bus, legacy devices, and two IO devices. The first IO bus is connected to the system bus. The legacy devices are connected to the first IO bus. The second and third IO buses are each connected to the system bus. The IO devices are each connected to a corresponding one of the second and third IO buses.

An other embodiment of the invention can be characterized as an apparatus for transferring data between at least one transport protocol stack and a plurality of network adapters coupled to a computer network that supports recovery from network adapter and a connection failure. The apparatus includes a first interface bound to at least one transport protocol stack and a plurality of network adapters coupled to a computer network that supports recovery from network adapter and connection failure. The apparatus includes a first interface bound to at least one transport protocol stack. It also includes a second interface bound to the plurality of network adapters, as well as a mechanism coupled to the first interface and the second interface that receives a first MAC-level packet from a transport protocol stack through the first interface and forwards the first MAC-level packet through the second interface to a network adapter in a protocol independent matter. The apparatus also includes a mechanism coupled to the first interface and the second interface that receives the second packet from a network adapter through the second interface and forwards the second packet through the first interface to a transport protocol stack.

According to another aspect of the present invention, the apparatus can function as a prescan protocol stack for examining packets flowing between protocol stacks and drivers.

DESCRIPTION OF THE FIGURES

FIG. 5 is a block diagram illustrating one embodiment of the structure of a probe packet for an Ethernet network system.

FIG. 6 is a block diagram illustrating one embodiment of the structure of a probe packet for a FDDI or Token Ring network system.

FIG. 8 is a block diagram of one embodiment of a MAC level packet, including a header, destination address and contents.

FIG. 10 is a flow diagram illustrating one embodiment of the steps involved in load sharing data packets across a plurality of network interface cards.

FIGS. 14A–B shows an embodiment of the dual I/O buses of a computer system with bridges and canisters which support a Hot-Add and Hot-Swap.

DESCRIPTION

Figure 1:
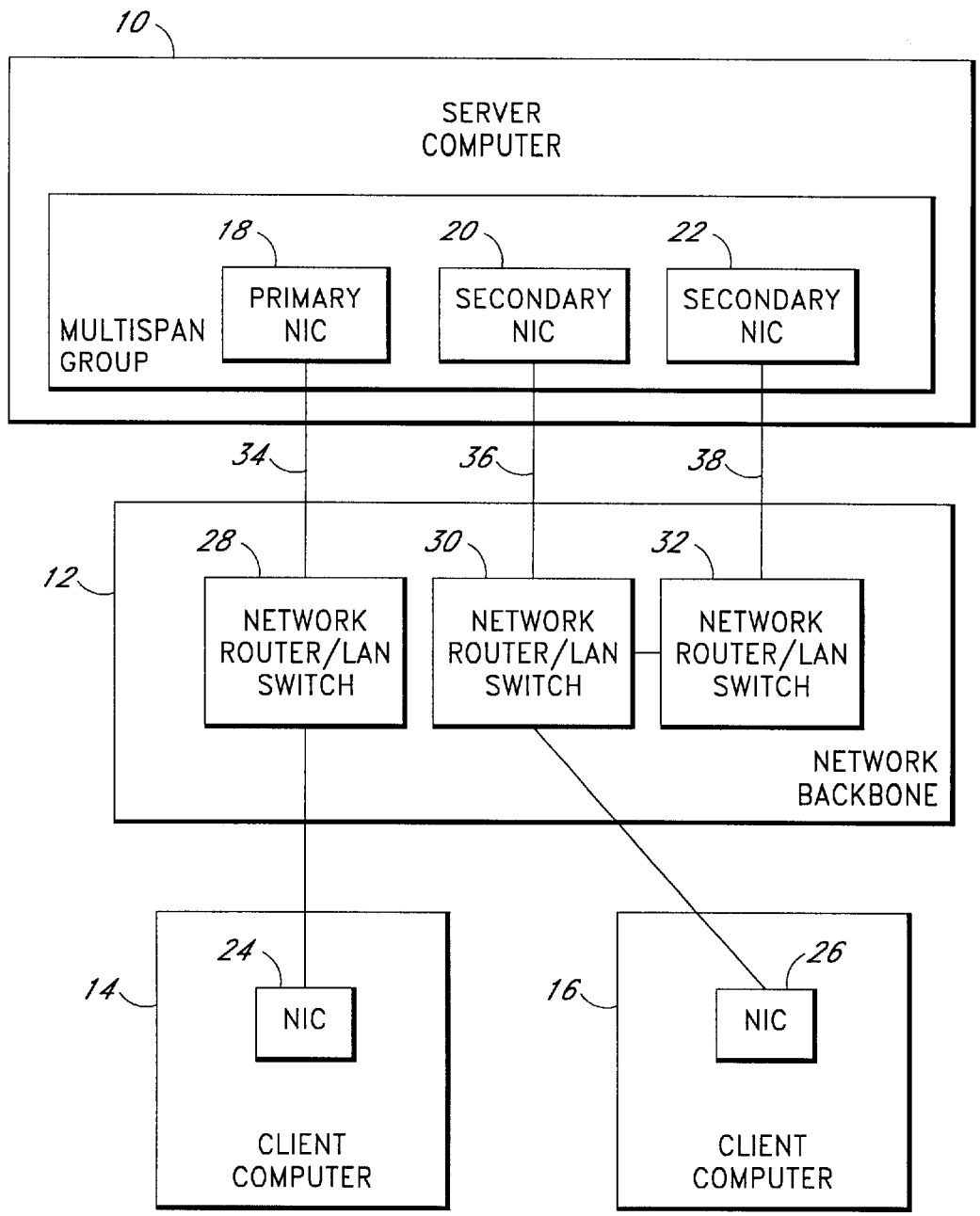
FIG. 1 is a block diagram illustrating one embodiment of a server computer and client computers linked in a network through network interface cards.

The present invention includes a system providing failure detection and re-routing of network packets in a computer having multiple network interface cards (NICs) connected as groups (MULTISPAN groups) each to a common network segment. In addition, embodiments of the invention include load sharing to distribute network packet traffic across the NICs in a group. Further, the present invention may provide this benefit to all traffic regardless of the network protocol used to route the traffic (i.e., in a protocol independent manner).

Fault detection and recovery is accomplished by "MULTISPAN", a process operating within the system. For each group of NICs, if there is a failure virtually on any component related to network traffic, the MULTISPAN process detects the interruption of the data flow and determines which NIC is no longer working. MULTISPAN directs traffic through only the working NICs until the failed NIC is again able to send and receive traffic reliably. Restoring a NIC to reliable operation may involve such steps as replacing a failed NIC (in a computer which supports the hot replacement of failed components), reconnecting or replacing a cable, replacing a failed network switch or router. By placing each NIC in the server on a separate path to the network, MULTISPAN will normally keep the system running until repairs can be accomplished. Being able to schedule repairs decreases cost of owning and operating the computer system.

The MULTISPAN system can be implemented in many different forms, as discussed below. Programming languages such as C, C++, Cobol, Fortran, Basic or any other conventional language can be employed to provide the functions of the MULTISPAN system. In addition, software related to the MULTISPAN system can be stored within many types of programmed storage devices. A programmed storage device can be a Random Access Memory, Read-Only Memory, floppy disk, hard disk, CD-ROM or the like.

In one embodiment, the present invention identifies one NIC, called the primary, by which the entire group is identified. Some operating systems disallow more than a single NIC on a single network segment. For such operating systems, this embodiment uses the primary to represent the entire group to the operating system. The remaining NICs in the group are hidden from the operating system.

In one embodiment of the invention, network failures are detected by a process of sending out "probe" packets with in a MultiSpan group from primary NIC to secondary NIC(s) and vice versa. If the probe packet fails to arrive at the target NIC, the failing path is determined and recovery procedure is performed. The MULTISPAN process confirms the source NIC that has failed by repeatedly sending packets to every other NIC in the group until, by process of elimination, the failing NIC is determined. If the failing NIC is a primary NIC, the MULTISPAN process stops routing network traffic through this unreachable/failed NIC. Traffic is thereafter directed through one of the remaining NIC(s), which is designated as the new primary (this process of designating a new primary when the current one fails is called fail-over). MULTISPAN continues to attempt to send probe packets to and from the failing NIC and, should probe packets once again be successfully delivered, the NIC is returned to service as a secondary.

In an embodiment of the present invention, the traffic load for a network segment is shared among all NICs in the group connected to the segment. Traffic inbound to the server from the network segment may arrive through any NIC in the group, and be properly delivered by MULTISPAN to the operating system. In some situations, all inbound traffic arrives through a single NIC (usually the primary), while in others traffic may arrive through all NICs at once. Traffic outbound from the server to the network segment is directed through some or all NICs in the group according to some algorithm which may vary from one embodiment to another, or may vary within one embodiment from one group to another.

FIG. 1 is an illustration of a server computer 10 linked through a network backbone 12 to client computers 14 and 16. The server computer 10 can be any well-known personal computer such as those based on an Intel microprocessor, Motorola microprocessor, Cyrix microprocessor or Alpha microprocessor. Intel microprocessors such as the Pentium®, Pentium® Pro and Pentium® II are well-known within the art. The server computer 10 includes a group of network interface cards (NICs) 18, 20, 22 which provide communications between the server computer 10 and the network backbone 12. Similarly, the client computer 14 includes a network interface card 24 and the client computer 16 includes a network interface card 26 for communicating with the network backbone 12. The network backbone 12 may be a cable such as a 10B2 Thin Ethernet cable, an Ethernet 10BT workgroup hub such as a 3Com Hub 8/TPC, or several interconnected switches or routers 28, 30, 32 such as a Cisco Catalyst 500, as shown in FIG. 1.

As will be explained in more detail below, the client computers 14 and 16 make requests for information from the server computer 10 through the network backbone 12. Under normal circumstances, the requests made by the client computers are acknowledged through the primary network interface card 18 to the server computer 10. However, if the primary network interface card 18, or cable 34 or switch or router 28 fails, the embodiments of the present invention provide a mechanism for routing network requests through one of the secondary network interface cards 20 or 22. The re-routing of network requests is transparent to the client computer 14 or 16.

Figure 2:
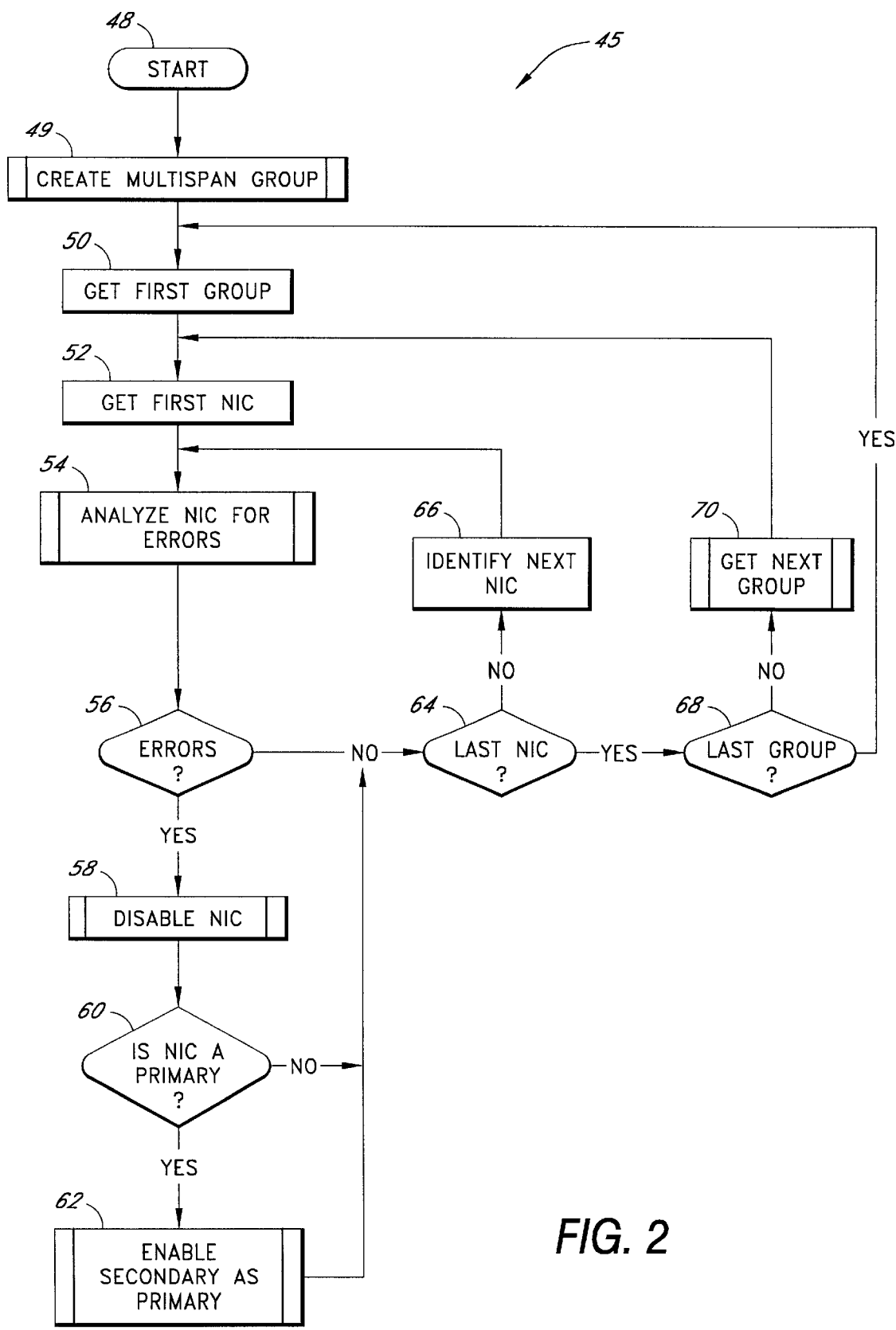
FIG. 2 is a flow diagram illustrating one embodiment of the overall process of detecting faulty network interface cards and automatically switching from a primary network interface card to a secondary network interface card.

FIG. 2 depicts one embodiment of the overall process 45 of detecting errors for NICs located in a MultiSpan group. The process 45 begins at a start state 48 and then moves to process 49 wherein a MULTISPAN group is created. During process 49, a user identifies the NICs to be grouped and issues a command to the MULTISPAN system to create a group. In one embodiment, the command is issued through a command prompt. In another embodiment, the command is issued through a management application which may be remote from or local to the computer system 10, and directed to the present invention via the simple network management protocol (SNMP) and associated SNMP agent software. If there is an error, the user is notified that there is a failure in creating the group. Otherwise, the user is returned with a prompt indicating that the MULTISPAN group was created successfully. The binding process will be discussed in more detail below. The MULTISPAN process uses the user-supplied information to associate all NICs in a particular group together and with their primary NIC.

The process 45 then moves to state 50 wherein the first MultiSpan group is retrieved. Proceeding to state 52, the first NIC in the current group is retrieved. At process state 54 the first NIC is analyzed to determine whether it is functioning properly, or is failing. The process 45 then moves to decision state 56 to determine whether any errors were detected. If a failure was detected at the decision state 56 for this NIC, the process 45 proceeds to state 58, wherein the NIC is disabled from the MULTISPAN group. The process 45 then proceeds to decision state 60 to determine whether the disabled NIC was a primary NIC. If a determination is made at state 60 that the failed NIC is a primary, the process 45 moves to process state 62 and enables the secondary NIC as a primary.

The process 45 then moves to decision state 64 to determine whether the current NIC is the last NIC in the MULTISPAN group. Similarly, if a determination is made at the decision state 56 that there were no errors, the process 45 also moves to decision state 64.

If a determination is made at the decision state 64 that there are more NICs in this MULTISPAN group, then process 45 moves to state 66 to select the next NIC to analyze. The process 45 then returns to process state 54 to analyze the newly selected NIC for errors.

If a determination is made at the decision state 64 that there are no more NICs in the current MULTISPAN group, the process 45 proceeds to decision state 68 to check whether this was the last group. If a determination is made that this is not the last group, the process 45 moves to process state 70 and selects the next group. The process 45 then returns to state 52 to begin analyzing the group's NICs. If a determination is made at the decision state 68 that this is the last group, the process 45 returns to state 50 to begin checking the first group once again.

Novell Netware Implementation

Figure 3:
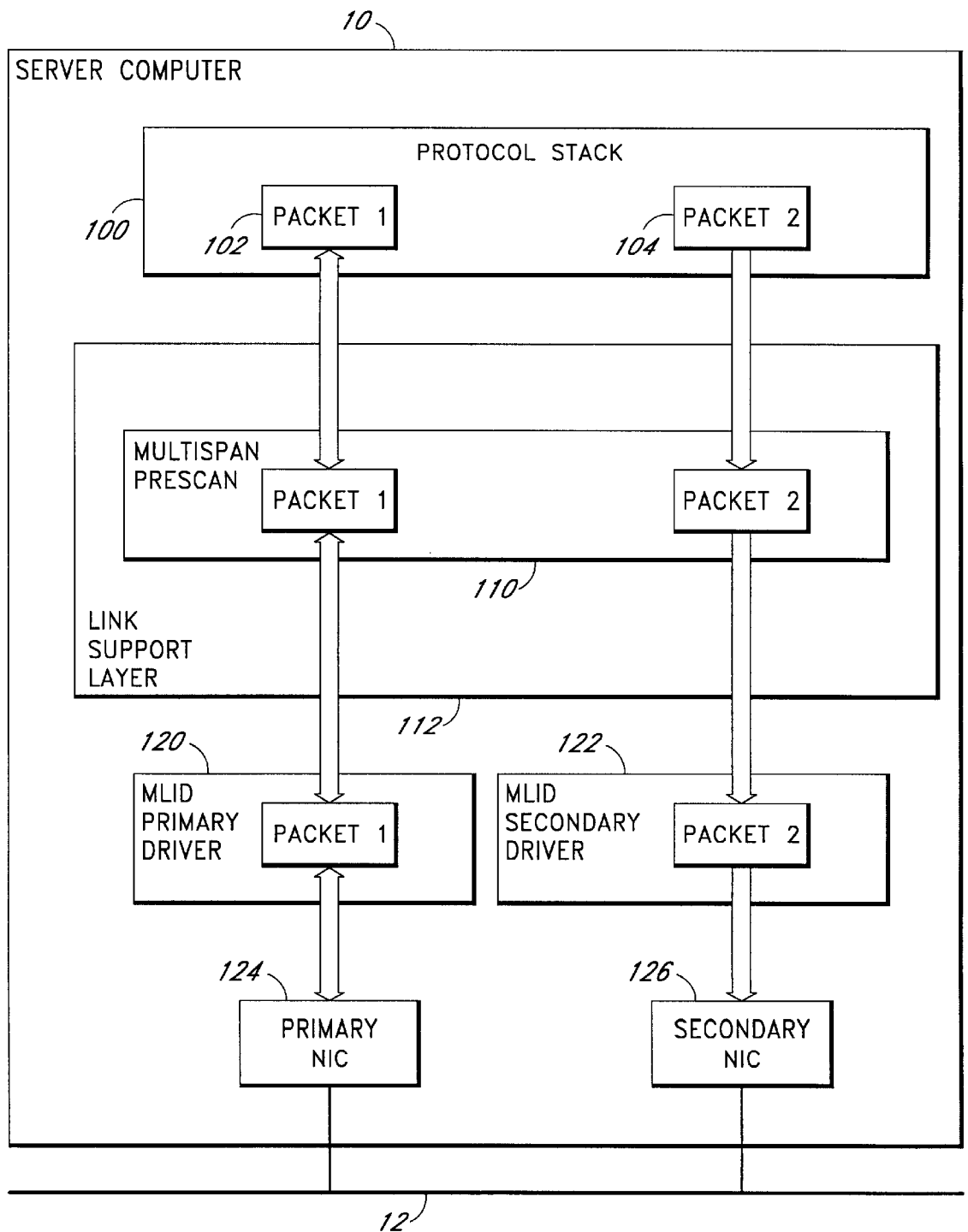
FIG. 3 is a block diagram illustrating an implementation of software modules running within a server computer under a Novell Netware network operating system.

Referring now to FIG. 3, an overview of the software modules running within the server computer 10 is illustrated. In the implementation described below, the server computer 10 is running under the Novell Netware operating system. As shown, a protocol stack 100 includes a first data packet 102 and a second data packet 104. In this figure, the protocol stack is the IPX (InternetNetwork Packet Exchange) protocol but could include TCP/IP or NETBEUI or any other network packet protocols in combinations for transmitting data across a network. As is known, generally client computers request data from server computers by attempting to read particular files within the server computer. In order for the client computers and server computer 10 to communicate across cables, the data is broken into a series of data packets. These data packets include network routing information and small portions of the requested data. The network packets are then routed from the server computer to the requesting client computer and thereafter rebuilt into the requested data file.

As is known, the link support layer (LSL) is the interface between drivers and protocol stacks within the Novell NetWare operating system. More information on the link support layer 112 and prescan drivers can be found in the Novell LAN Developer Guide (Novell Corporation, Orem Utah).

The main objectives embodiments of the MULTISPAN processes are (1) to load share LAN traffic among NICs in a group, and (2) to perform a transparent fail-over when a primary adapter in a group fails. These features may be achieved essentially without modification to the transport protocol portions of the packets. Instead, the features are achieved through system services provided for interfacing with LAN drivers and other Netware system modules like the Media Specific Module (MSM), Topology Specific Module (TSM) and Link Support Layer (LSL). The MULTISPAN process may be a totally media-dependent intermediate module.

Once drivers for primary and secondary NICs are loaded, a multispan group can be created by issuing MSP BIND statement, specifying the slot numbers of primary and secondary adapters. If there are any protocol stacks bound to the secondary NIC, the MULTISPAN process displays an error message and does not create a MULTISPAN group.

The user can optionally specify more than one secondary NIC when creating a group. Typically this is done to allow load sharing of the outbound LAN traffic across all the NMCs. If any LAN drivers had been loaded before loading MSP.NLM, then MSP BIND command does not create any MULTISPAN groups and displays the error message "Error locating DCT Address in Internal Table". Thus, the MSP-.NLM module should be loaded before any LAN drivers. As discussed above, MSP.NLM module should normally be loaded under Netware through the STARTUP.NCF file.

The MULTISPAN system allows users to configure LAN cards of same topology, but different kind (example Intel Smart card and Intel Pro 100B card) into a MULTISPAN group. For example, issuing the following commands will load several Ethernet cards and bind them into a MULTISPAN group.

load e100b.lan slot=10001 frame=ethernet_802.2 name=primary_8022
load e100b.lan slot=10001 frame=ethernet_802.3 name=primary_8023
load e100b.lan slot=10002 frame=ethernet_802.2 name=secondary_8022
load e100b.lan slot=10002 frame=ethernet_802.3 name=secondary_8023
bind ipx to primary_8022 net=f001
bind ipx to primary_8023 net=f002
MSP BIND 10001 10002

The MSP Bind command can also be issued specifying logical names associated with the primary and secondary NICs. For example:
MSP NAMEBIND primary_8022 secondary_8022

Once the MSP BIND or MSP NAMEBIND commands have been issued, a MULTISPAN group is created for all logical frame types supported by the NIC. In addition, the probing mechanism becomes active for the current base frame. In the case of above example group gets created for frame type of ETHERNET_802.2 and ETHERNET_802.3. When a group gets created, MULTISPAN performs "Link Intergrity" check to make sure that all the NICs in the group are accessable from one to another by using the same probing mechanism described earlier. If the check fails the user is displayed with appropriate error messages.

The MULTISPAN NLM gains control over the network activity by registering a prescan protocol stack for sends and receives. The purpose of a prescan protocol stack is to provide the ability to examine the packets flowing between protocol stacks and drivers. MULTISPAN also intercepts the MLID registration process by patching the LSL portion of server code during the software load time. In Netware, protocol stacks send packets via LSL using a buffer known as ECBs (Event Control Block), which not only contains the address of the packet payload and its length but also contains information such as about which NIC to use and what frame type to use on the medium. This information is helps LSL in deciding the driver interface it needs to correspond to, in sending a packet. When LSL corresponds to MULTISPAN PreScan stack, it uses the same data structure to pass in information.

As illustrated in FIG. 3, a packet 102 is sent from the IPX protocol stack 100 via LSL 112. The LSL checks the registered pre-scan stack and calls the MULTISPAN PreScan send handler routine. The MULTISPAN PRESCAN process 110 determines the NIC through which the packet is to be sent.

Once the packets 102 and 104 have been analyzed by the MULTISPAN prescan module 110, they are output to their target network interface driver 120 and 122 respectively, and thereafter sent to the network backbone 12. By way of illustration, the packet 104 could be routed through the MULTISPAN prescan module 110 to a secondary network interface card driver 122 and thereafter out to the network backbone 12. It should be noted that during normal operations, Novell NetWare would only allow packets to flow through a single network interface card. MULTISPAN presents the primary NIC of each group as this single adapter, transparently applying its load sharing and failure recovery functions to the group.

Thus, data packet 104 can be sent to the LSL 112 with information to route it through the primary driver 120 to a NIC 124. However, in order to distribute the load, the MULTISPAN prescan module 110 intercepts the packet 104 and alters its destination so that it flows through the secondary driver module 122 to the NIC 126 and out to the network backbone 12.

By the same mechanism, if the primary driver 120 or primary NIC 124 fails, the MULTISPAN prescan module 110 can route the packet 102 into the secondary driver 122 and out to the NIC 126. By determining the destination of every packet coming through the LSL, the MULTISPAN prescan module 110 can completely control the ultimate destination of each packet.

During the load process, the MULTISPAN module patches the server code for the NetWare functions LSLRegisterMLIDRTag() and LSLDeRegisterMLID(). In addition, the MULTISPAN module allocates enough memory needed for maintaining information pertinent to logical boards such as the address of the DriverConfigTable, Multicast address list, and original DriverControlEntry. Initialization related to generating NetWare Alerts is done at this point and an AESCallBack procedure is scheduled for managing the probing functionality.

After loading the MULTISPAN.NLM, the user can configure the system to load drivers for both the primary NIC and one or more secondary NICs using the INETCFG command or by manually editing AUTOEXEC.NCF or manually loading drivers at the system console. The user can also choose the appropriate protocol stack to bind with for every instance of the primary NIC. Once this process is done, the MULTISPAN BIND command can be issued to associate NICs together into a group, and designate a primary adapter for the group.

As part of initialization, LAN drivers typically make call to register their instance with LSL via LSLRegisterM-LIDRTag. This call manages all information pertinent to an occurrence of a logical board and assigns the caller with next logical board available. When the LSLRegisterMLIDRTag function is called by the NetWare drivers (MLIDs), control jumps to the MULTISPAN code as a result of a patch in the LSL made by the MULTISPAN module while loading. The MULTISPAN system saves the addresses of certain MLID data structures and maintains internal tables for every logical board. This information is passed to the real target of the MLID's call.

This technique allows embodiments of the MULTISPAN system to intercept certain dialogs between the MLID and the LSL or the protocol stacks for such purposes as establishing or changing multicast address lists and the Driver-Config Table. When a fail-over takes place, the MULTISPAN system can retrieve the multicast list from the local internal table and send a multicast update call to the switched-over NIC.

In addition to intercepting the control handler, MULTISPAN also intercepts the DriverReset call. When the DriverReset call fails for some reason (e.g., NIC is powered off during hot swap), MSM usually removes the instance of that driver from memory and makes it impossible to activate the driver for that particular instance. By intercepting the reset call, MULTISPAN can tell MSM that reset was successful but generate an NetWare Alert for failure of a particular adapter. Since MULTISPAN knows which NIC is active and which is not, it ensures that there are no side effects in doing this kind of interception.

Once the MULTISPAN BIND command is issued, the bind procedure locates the appropriate logical boards corresponding to the arguments specified and creates a MULTISPAN group for all logical frames that the NIC currently supports. The primary NIC is specified first, followed by one or more secondary NICs. The MULTISPAN process forms a group only if there is a match for frame-type across all NICs specified. Note that the primary NIC should have a protocol stack bound to it and that a secondaries should not have any protocol stack bound to them.

Once a MULTISPAN group of NICs is created, the probing module starts sending probe packets from the primary NIC to all secondary NICs and from all secondary NICs to the primary NIC to monitor the status of the network link. The structure of a the payload portion of a probe packet is illustrated by the data structure definition below:

```
struct HEART_BEAT {
    LONG signature; //LONG value of 'NMSP'
    LONG seqNo; // sequence number of the probe packet
        sent.
    LONG pSource; // pointer to structure pertaining to the
        source board
    LONG pDestn; // pointer to structure pertaining to the
        destination board
};
struct IPX_HEADER {
    WORD checkSum; //0xFFFF always
    WORD packetLength; //size of IPX_HEADER+size
        of HEARTBEAT
    BYTE transportControl; //zero,not used
    BYTE packetType; //IPX_PACKET
    BYTE destinationNetwork[4]; //zero
    BYTE destinationNode[6]; //corresponds to node
        address of destination board.
    WORD destSocket; //value returned by
        IPXOpenSocket() call.
    BYTE sourceNetwork[4]; //zero
    BYTE sourceNode[6]; //corresponds to node address of
        source board
    WORD sourceSocket; //value returned by
        IPXOpenSocketo() call.
};
struct PROBE_PACKET {
    IPX_HEADER ipxHeader;
    HEART_BEAT heartBeat;
};
```

If any packets are not received, MULTISPAN system re-transmits the probe packet for a specified number of times. If there is a repeated failure, the MULTISPAN system determines which NIC failed by analyzing which packets were received and which were not, and removes the failing board from the bound group and deactivates the adapter by placing it in a wait mode. The MULTISPAN system thereafter monitors the deactivated board to determine if data packet reception begins to occur again on the deactivated board. If there is no packet reception for a specified time, MULTISPAN marks the board as dead. If the primary NIC is marked as dead, and there is at least one active secondary, then MULTISPAN does switch-over by causing a secondary NIC to be the primary. This is accomplished by shutting the board, changing the node address of the secondary NIC to that of primary NIC in the Driver Configuration Table (DCT) and then resetting the NIC. In addition, the multicast table of the original primary NIC is transferred to the switched-over primary and promiscuous mode is turned on if it was originally active for the primary.

In one embodiment, the MULTISPAN system also resets the source node address field in TCBs (Transmission Control Blocks) maintained by TSM for both failed and switch-over adapter. This is done to ensure that all load sharing NICs send packets with their current address, not the original address which was identified during load time thus eliminating the confusion with certain protocols (such as Ethertalk), which direct the requests to the node from which a reply was received.

Once the MULTISPAN system detects data packet reception on the old primary NIC, it activates the card to be a part of the group. The reactivated card then becomes a new secondary. If load sharing is enabled, the MULTISPAN system begins to use the board to share the outbound traffic. The fail-over process works the same way on this new configuration as before.

In order to load share the outbound traffic, MULTISPAN requires at least one secondary in a group. This feature can be enabled or disabled during runtime through the MULTISPAN LOAD SHARING command, which toggles this mode. When a packet is sent from the protocol stack 100 to the primary NIC 124 (the board which is known to the protocol stack), the MULTISPAN system intercepts the request and selects the next active board from the group on which the packet could be sent and changes the board number to the one selected. In one embodiment, the algorithm is based on a round-robin mechanism where every NIC in the group gets a turn to send packets. If a selected board in the bound group is marked "DISABLED", the MULTISPAN system bypasses that board and selects the next active board in the group. In another embodiment, the algorithm used makes a calculation based on the destination address in order to make routing of outgoing packets predictable to switches or routers connected to the group's NICs.

During load sharing, the MULTISPAN system changes the SendCompleteHandler in the Event Control Block (ECB) of the data packet to point to MULTISPAN primary NIC SendCompleteHandler. The purpose of this is to restore the original board number when the ECBs get handed back to the protocol stack through the LSL. This also fixes the problem when the system is running with Novell's IPXRTR product, wherein the Netware Core Protocol (NCP) does not recognize SendCompletes on the secondary NIC to which the protocol stacks are not bound.

Although the MULTISPAN system has been described above in relation to a Novell Netware implementation, the system is not so limited. For example, the MULTISPAN process can be implemented within other network operating systems such as Microsoft Windows NT, as discussed below.

Windows NT Implementation

Figure 4:
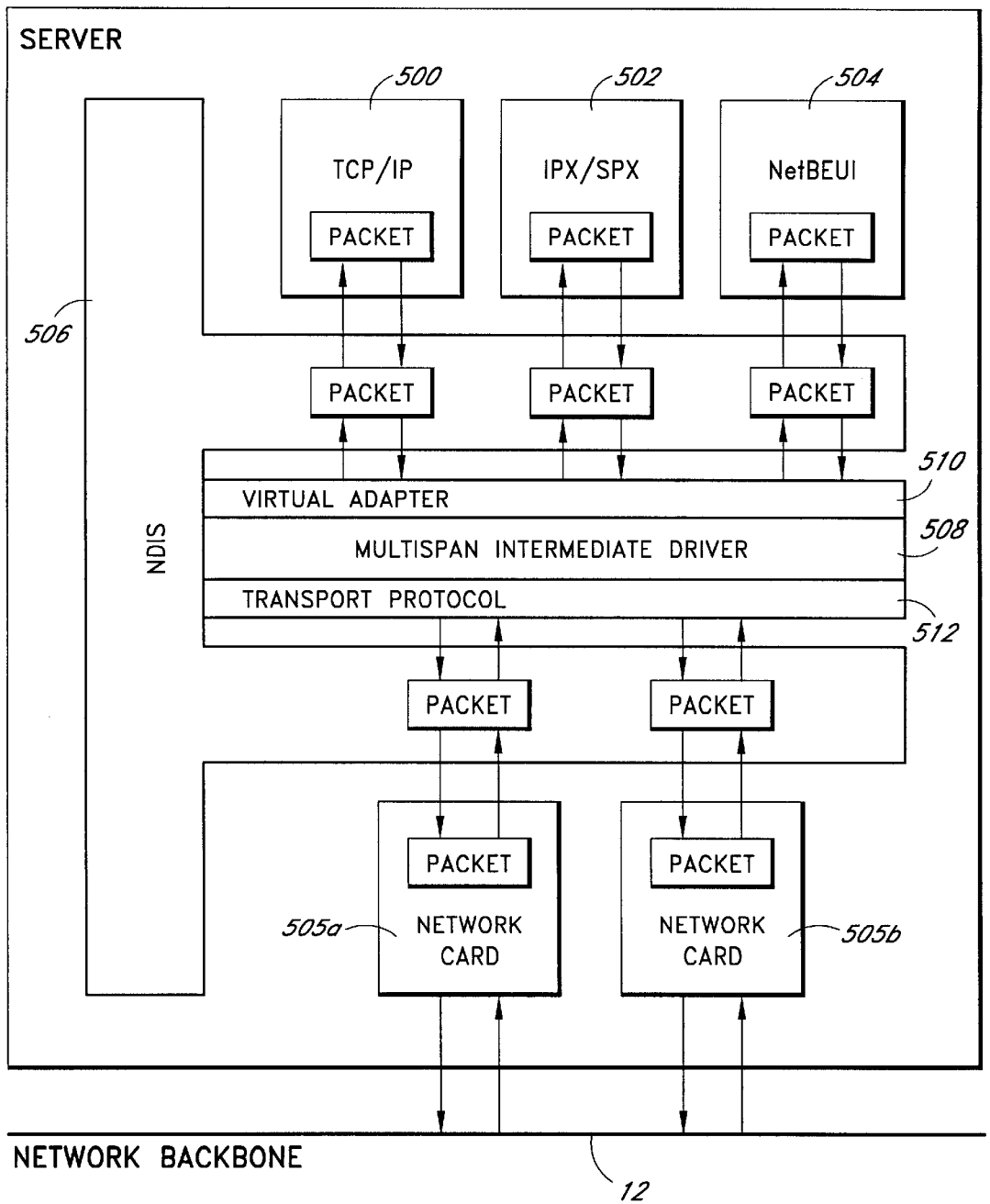
FIG. 4 is a block diagram illustrating an implementation of software modules running within a server computer under a Microsoft® Windows® NT network operating system.

FIG. 4 is a block diagram illustrating some of the major functional components of a Microsoft® Windows® NT system for transferring data between a plurality of protocol stacks 500, 502 and 504 and a plurality of NICs 505*a,b* in accordance with an aspect of the present invention. The protocol stacks include TCP/IP protocol stack 500, IPX/SPX (Synchronous Packet Exchange) protocol stack 502 and net BEUI protocol stack 504. These protocol stacks connect to NDIS 506, which is part of the Microsoft® Windows® NT operating system. NDIS 506 connects to NICs 18, 20 & 22 and additionally connects to a MULTISPAN system 508, which performs load sharing and fail-over functions.

A variety of references and device driver development kits are available from Microsoft describing the LAN driver model, NDIS, and how they interact. These will be familiar to anyone of ordinary skill in writing such drivers for Windows NT. The MULTISPAN system 508 is an NDIS 4.0 intermediate driver. FIG. 4 illustrates the relationship between the NDIS wrapper, transport protocols, NIC driver, and MULTISPAN driver in a Windows® NT system.

When the MULTISPAN driver 508 loads, it registers itself as an NDIS 4.0 intermediate driver. It creates a virtual adapter 510 on its upper edge for each group of NICs. The virtual adapter 510 binds to the transport protocols 500, 502 and 504 (e.g., TCP/IP, IPX/SPX). The lower edge 512 of the MULTISPAN driver 508 behaves like a transport protocol and binds to network interface cards 505a,b. When, for example, the TCP/IP protocol stack 500 sends out packets, they are intercepted by the MULTISPAN driver 508 first. The MULTISPAN driver 508 then sends them to the appropriate network adapter 505a or 505b. All the packets received by the NICs are passed to the bound MULTISPAN driver 508. The MULTISPAN driver then decides whether it should forward the packets to the transport protocols, depending on the state of the adapter.

The MULTISPAN driver is also responsible for verifying the availability of bound NICs. It detects adapter failures by periodically monitoring the activity of the NICs, as will be discussed in more detail below. If an adapter has failed, the MULTISPAN driver 508 disables the adapter and records it in the event log. If the failed NIC was a primary adapter, the MULTISPAN driver selects a secondary NIC to become the primary adapter.

Since Windows® NT does not allow the network address of a NIC to be changed dynamically, all the NICs bound to the MULTISPAN driver are configured to the same physical address when they are loaded. When the primary adapter fails, the MULTISPAN driver disables it and starts sending and receiving packets through a secondary adapter.

The MULTISPAN driver 508 continuously tracks the state of bound network interface cards. There are three different states for network interface cards. The "IN_USE" state means that the adapter is the primary adapter. All packets will be sent and received through this adapter when the load sharing feature is disabled. When load sharing is enabled, packets are sent out from all available NICs. The "READY" state means the adapter is in standby mode, but is operating correctly. When the primary adapter fails, one of the adapters in the "READY" state is changed to the "IN_USE" state and begins to send and receive packets. When the adapter cannot send or receive packets, it is set to a "DISABLED" state. The MULTISPAN driver sends packets out from the primary adapter (the NIC in "IN USE" state). It simply passes packets received from the primary adapter up to the protocols and discards packets received from all the other adapters.

The MULTISPAN driver 508 continuously monitors the activity of any bound adapters. In most LAN segments, "broadcast" packets are periodically sent out by different machines. All the NICs attached to the LAN segment should receive these packets. Therefore, if a network adapter has not received any packets for an extended period of time, it might not be functioning correctly. The MULTISPAN driver 508 uses this information to determine if the bound network interface card is functioning correctly. For those LAN segments where no stations send out broadcast packets, the MULTISPAN driver sends out probe packets, as discussed above in the Novell Netware implementation. All the NICs should receive probe packets, since they are broadcast packets. A NIC will be disabled if it does not receive these probe packets.

When the network adapter is in an "IN_USE" state, and its receiver idle time exceeds a pre-set threshold, that adapter might not be operating correctly. The Receiver idle time for a NIC is the time that has elapsed since the last packet was received by the NIC. The MULTISPAN driver then scans through all the adapters in the "READY" state. If the receiver idle time of an adapter in a "READY" state is shorter than that of the primary adapter, the MULTISPAN driver disables the primary adapter by setting it to the "DISABLED" state and changes the adapter in "READY" state to the "IN_USE" state. This adapter then becomes the primary adapter. The MULTISPAN system will now begin using the new network adapter to send and receive packets.

If the adapter is in a "READY" state and has not received any packets for a period of time, the MULTISPAN driver places the adapter in a "DISABLED" state. If the adapter is fixed and starts receiving packets, it is changed to the "READY" state.

The MULTISPAN driver uses an adapter packet filter to reduce the overhead introduced by the secondary adapters the MULTISPAN driver sets the packet filter depending on the state of the adapter. When the adapter is in the "IN_USE" state, the filter is set by transport protocols. Normally, transport protocols set the filter to receive broadcast, multicast and directed packets. When the adapter is in the "READY" state, the packet filter is set to receive only multicast and broadcast packets. This should minimize the impact on performance. An adapter in the "DISABLED" state will receive all broadcast multicast and directed packets. Once the adapter is replaced or the cable is reconnected so that the adapter can again receive packets, it is switched to the "READY" state and its packet filter is set accordingly.

Windows NT uses a registry database is to store configuration information. Each driver in Windows NT has at least one entry in the following subkey:

HKEY_LOCAL_MACHINE\SYSTEM\CurrentControlSetServices

The drivers can store configurable parameter values under the driver's subkey. NDIS drivers also store binding information inside the subkey. For a normal NDIS NIC driver, one entry is created for the NDIS miniport interface and one subkey is created for each adapter that is installed.

As discussed above, MULTISPAN is an NDIS intermediate driver which has a miniport interface on its upper edge and a transport interface on its lower edge. Each interface needs a separate subkey to describe it.

After installing the MULTISPAN driver, the installation program (oemsetup.inf) creates
HKEY_LOCAL_
    MACHINE\SYSTEM\CurrentControlSet\Services\mspan
for its NDIS transport interface and
HKEY_LOCAL_
    MACHINE\SYSTEM\CurrentControlSet\Services\mspm
for its NDIS miniport interface. It also creates
HKEY_LOCAL_
    MACHINE\SYSTEM\CurrentControlSet\Services\mspa#
for each virtual adapter installed, where # is the adapter
    number assigned by Windows NT. For each NIC bound to
    the MULTISPAN driver, a Span subkey is created under
HKEY_LOCAL_
    MACHINE\SYSTEM\CurrentControlSet\Services\NE
    TCARD#\ Parameters.
to configure how the NIC is bound to the MULTISPAN
    virtual adapter.

There are two entries in the Parameters subkey. "Connect" stores the name of the virtual MULTISPAN adapter to which the NIC is connected. All network interface cards belonging to the same group will have the same Connect value. "Number" stores the sequence number of the adapter. Number zero means that this adapter is the primary adapter of the adapter group. For example, the registry might resemble the following:

HKEY_LOCAL_
   MACHINE\SYSTEM\CurrentControlSet\Services\E 100B1\Parameters.
   Connect: REG_SZ: mspa3
   Number: REG_DWORD: 0x1

The installation script also creates a Network Address under the Parameters subkey of all bound adapters. This stores the actual MAC address used for the adapter group.

The MULTISPAN driver stores configurable parameters in

HKEY_LOCAL_
   MACHINE\SYSTEM\CurrentControlSet\Services\msp a#\Parameters.

The following are values in the subkey of the REG_DWORD data type CheckTime, DisableTime, IdleTime, ProbeTime, LoadBalance. Network Address is a value in the subkey of the REG_SZ type. These values are described in detail in the following section.

There are five different parameters in the Windows NT registry which control the behavior of the MULTISPAN driver. The user can set these parameters based on the operational environment.

Check Time determines how often the MULTISPAN driver checks if the adapter is still alive. The recommended value is 1000 milliseconds (1 second). The maximum value is 1000 seconds in some embodiments.

Probe Time determines if the MULTISPAN driver should send out a probe packet if the bound adapter has not received a packet for the specified period of time. For example, if the Probe Time is set to 2000 milliseconds, the MULTISPAN driver will send out a probe packet if the adapter has not received any packets during a two second interval. If the Probe Time is set to 0, no probe packet will be sent out. The Probe Time value should be either greater than or equal to the Check Time, unless it is zero. The default value is 3000 milliseconds.

Disable Time determines when the MULTISPAN driver is to disable a bound adapter. If the adapter has not received any packets in the specified time, the MULTISPAN driver disables the adapter. The default value is 8000 milliseconds.

Idle Time determines when the MULTISPAN driver should switch to the secondary adapter if the primary adapter has not received any packets within the specified time period. The Idle Time value should be greater than the Check Time and Probe Time values. The default value is 4000 milliseconds.

FIG. 5 illustrates the structure of a probe packet for an Ethernet system in accordance with an aspect of the present invention. The packet includes a number of fields, including a destination address 700, source address 702, packet type 704 and adapter ID 706.

Since Windows NT does not allow the network address of a NIC to be changed dynamically, all the NICs that are bound to the same MULTISPAN virtual adapter are configured to the same physical address when they are loaded, which is called the MULTISPAN Virtual Network Address. Ethernet hardware addresses are 48 bits, expressed as 12 hexadecimal digits. The first 2 digits have to be 02 to represent the locally administrated address. It is recommended that 00 be used as the last two digits to support load sharing. The MULTISPAN Virtual Network Address should appear as follows:

0x02XXXXXXXX00 where XXXXXXXX are arbitrary hexadecimal numbers. This address has to be unique among single Ethernet segments.

FIG. 6 illustrates the structure of a probe packet for FDDI and token ring networks. The probe packet illustrated in FIG. 6 includes Access Control (ACS CTL) 800, Frame Control (FRM CTL) 802, destination address 804, source address 806, Destination Service Access Point (DSAP) 808, Source Service Access Point (SSAP) 810, CTL 812, protocol 814, packet type 816 and adapter ID 818.

Since an FDDI and Token-Ring networks do not allow two adapters with the same network address to coexist on the same network segment, the same mechanism described in the Ethernet section cannot be used to handle the fail-over process. The MULTISPAN driver therefore uses special FDDI and Token-Ring NIC drivers to provide the mechanism for resetting the NIC and changing the network address. On startup, only the primary adapter's address is overwritten to the MULTISPAN Virtual Network Address. All the other adapters use the address which is generated from Virtual Network Address and the adapter number assigned by NT. When the primary card has failed, MULTISPAN resets and changes the address of the primary adapter to the address generated from Virtual Network Address and its adapter number; it then resets and changes the network address of the secondary adapter to the MULTISPAN Virtual Network Address and uses that card as the primary adapter.

FDDI network addresses are 48 bits long, expressed as 12 hexadecimal digits. The first 2 digits have to be 02 to represent the address of the locally administrated station. It is recommended that 00 be used as the last two digits to support load sharing. The MULTISPAN Virtual Network Address should appear as follows:

XXXXXXXX00 where XXXXXXXX are arbitrary hexadecimal numbers. This address must be unique within a single ring segment.

Figure 7:
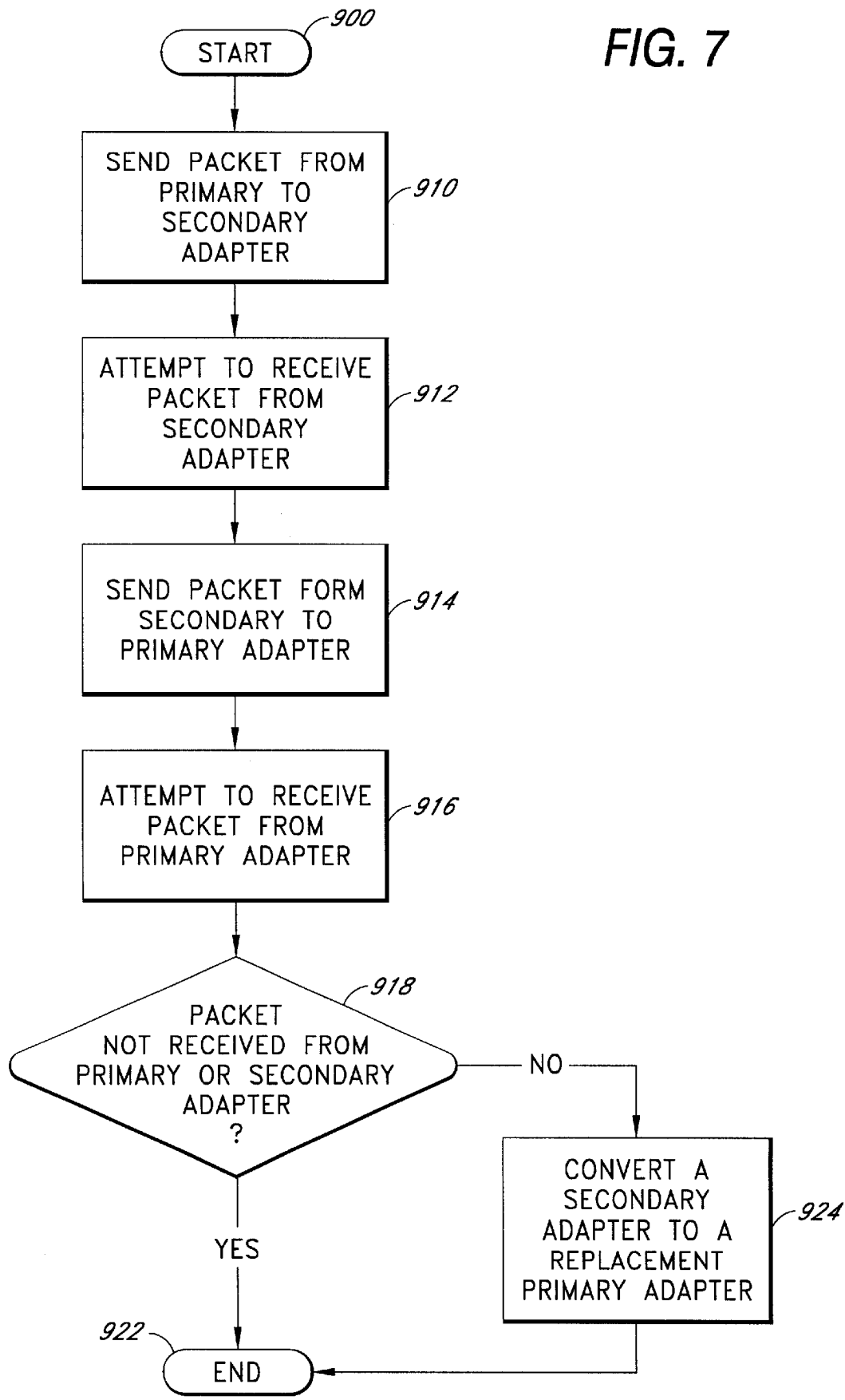
FIG. 7 is a flow diagram illustrating one embodiment of a process for determining whether a network interface adapter has failed.

FIG. 7 is a flowchart illustrating one embodiment of a method for determining whether a network adapter has failed. The network adapters are divided into a primary adapter and a plurality of secondary adapters. The method illustrated in FIG. 7 determines whether the primary adapter has failed. The method begins at state 900 which is a start state.

The system next advances to state 910 in which a packet is sent from the primary to a secondary adapter. In one embodiment, the primary sends packets to all of the secondary adapters in sequence. Next, the system advances to state 912. In state 912, the system attempts to receive a packet from the secondary adapter. The system next advances to state 914. At state 914, the system sends a packet from a secondary adapter to the primary adapter. In one embodiment, all of the secondary adapters send a packet to the primary adapter. The system next advances to state 916. At state 916, the system attempts to receive a packet from the primary adapter. The system next advances to state 918.

At state 918, the system determines whether a packet has not been received from the primary adapter or if the packet has not been received from the secondary adapter. If no packets have been received from either the primary or secondary adapter, the system assumes that the primary adapter has failed. The system then advances to step 924. At step 924, the system converts a secondary adapter to a replacement primary adapter. The system then proceeds to state 922, which is an end state. At state 918, if a packet had been received from either the primary or the secondary adapter, then the system assumes that the primary adapter has not failed and it proceeds to the end state 922.

One embodiment of the present invention operates at the MAC level and lower, thus avoiding the complexity of providing software support for higher layer protocols. As indicated in FIG. 8, the structure of a MAC-level packet 1005 illustrated. These packets include a header with a destination address 1010 and protocol-level header 1020 for storing protocol information for protocols such as TCP/IP, IPX/SPX and NET BEUI. In addition, the MAC packet 1005 can include contents 1025.

Figure 9:
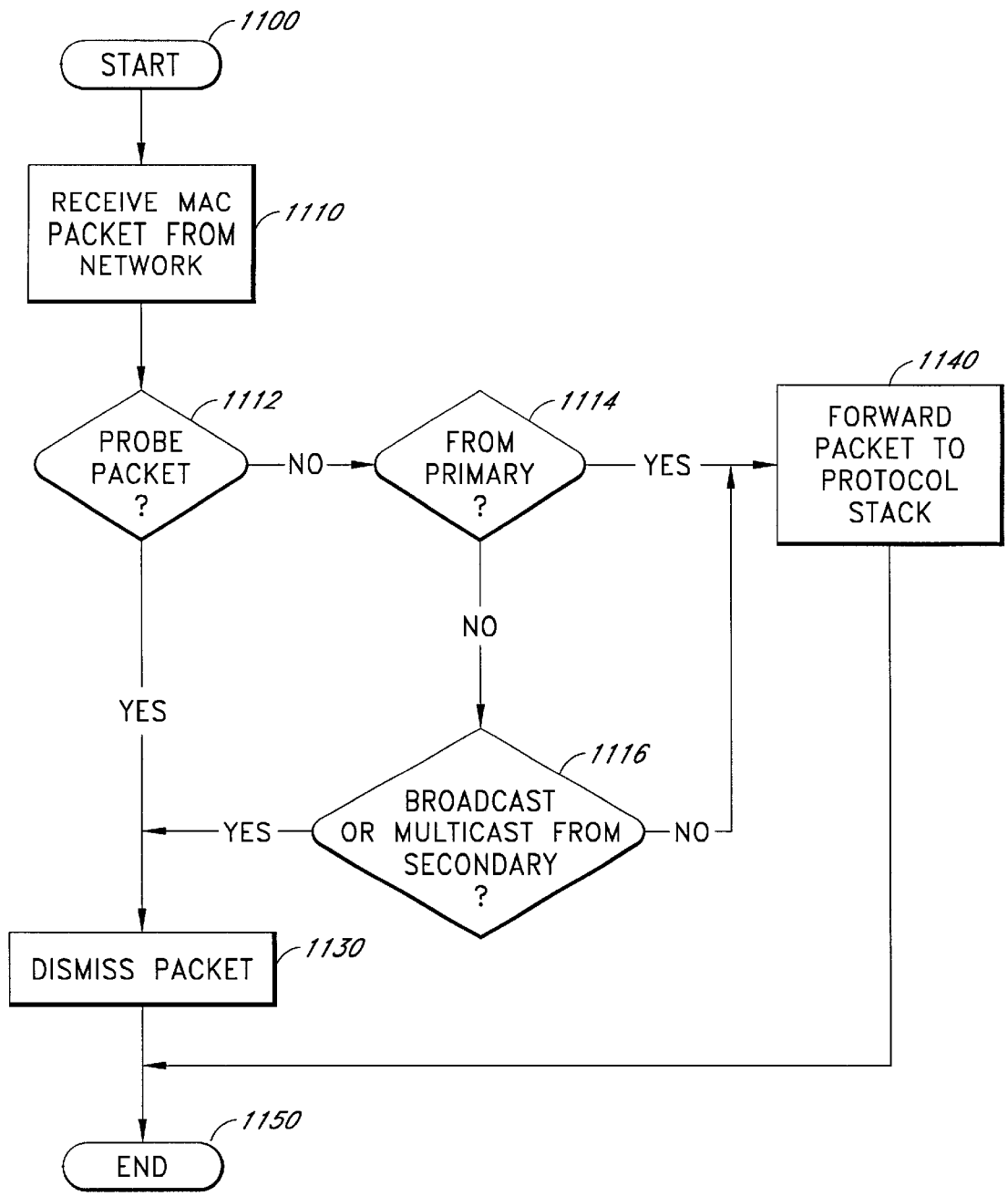
FIG. 9 is a flow diagram illustrating one embodiment of the steps involved in moving data packets between network interface cards and protocol.

FIG. 9 is a flow chart illustrating some of the steps involved in receiving packets through the NICs using the apparatus illustrated in FIGS. 3 and 4 in accordance with one embodiment of the present invention. The process starts at start 1100 which is a start state. The system next proceeds to state 1110 when a NIC of a group receives a first MAC-level packet from the network. The system next proceeds to decision state 1112, wherein the MULTISPAN system determines whether the packet is a probe packet. If the packet is a probe packet, then the system moves to state 1120 and updates the state of the NIC to indicate that the probe packet has been sent correctly. The system then moves to state 1130 wherein the packet is dismissed and the process terminates at end state 1150 without forwarding the packet to any protocol stack.

If a decision is made at decision state 1112 that the packet is not a probe packet, then the system moves to decision state 1114 to determine whether the packet is from a primary NIC. If so, then the system proceeds to state 1140, where the packet is passed to the protocol stack. Thus, the normal packet receive path is from state 1110 to 1112 to 1114 to 1140 then to 1150, the end state.

If a determination is made at decision state 1114 that the packet is from a secondary (not a primary) NIC, then system proceeds to a decision state 1116 to decide whether the packet is a multicast or broadcast packet. If the packet is a multicast or broadcast packet, then the system assumes that the same packet was received by all NICs in the group, and the system proceeds to state 1130 to discard the packet. However, if the packet is not a broadcast or multicast packet at decision state 116, the system proceeds to state 1140 and passes the packet to the protocol stack for processing. In some embodiments, state 1140 will make all packets forwarded to the protocol stack look like they arrived through the primary NIC.

FIG. 10 is a flow chart illustrating some of the steps involved in load sharing packets across a plurality of NICs in accordance with one embodiment of the present invention. The process starts at a start state 1200 and then moves to state 1210 wherein the system receives a MAC-level packet from a protocol stack. The system next proceeds to state 1220 selects a NIC to send out packets from the plurality of NICs according to an algorithm specific to one embodiment of the invention. Some embodiments will choose a NIC that is less loaded than at least one other NIC in the plurality of NICs. The system then proceeds to state 1230 and routes the MAC-level packet to the NIC selected at state 1220. The system the terminates at an end state 1240.

MULTISPAN COMMAND REFERENCE

| Command | : MSP BIND |
|---|---|
| Description | : |

Used for creating multispan group by specifying slot numbers (port number if slot is NULL) of primary and secondary NICs.

| Format | : MSP BIND PrimarySlotNo SecondarySlotNo |
|---|---|
|  | or |
|  | MSP BIND PrimaryPortNo SecondaryPortNo |
| Example: | : MSP BIND 10001 10002 |
|  | MSP BIND 0x5a 0x6a (used when slot number is NULL) |
| Default | : None |
| Messages | : |

For all successful creation of the MULTISPAN group, the MULTISPAN system displays "Group has been created for Primary Slot # xxxx and Frame_Type:yyyy". If there is a group already present, MSP displays error message "Group Already Present". MSP displays "failed to create a group", if multispan is unable to create group for at least one frame type supported by the NIC.

Error Conditions:

1. No valid primary or secondary NIC
2. primary does not have any bound protocol stack
3. secondary has a protocol stack bound
4. Link Intergrity check failed

| Command | : MSP UNBIND |
|---|---|
| Description | : |

Used for deleting a multispan group from the list. To delete a group, the user specifies the slot number associated with primary NIC (port in case slot number is NULL). The group gets deleted automatically if LAN driver for that group is unloaded.

| Format | : MSP UNBIND PrimarySlotNo |
|---|---|
| Example: | : MSP UNBIND 10001 |
| Default | : None |
| Messages | : |

If successful, MSP displays "Cleaning Up resources for group associated with Primary Slot #xxxx" for all frame types supported by NIC.

| Command | : MSP SEND TMO |
|---|---|
| Description | : |

Used for setting probe send timeout value. This command changes the values of MSP_PROBE_SEND_TIMEOUT variable for any given group, if there is a valid argument.

MSP waits for MSP_PROBE_SEND_TIMEOUT seconds, when LSL has been requested to sendprobe packets and the request does not get acknowledged. After waiting for specified time, MSP retransmits the probe packet.

| Format | : MSP SEND TMO <SlotNo><ValueInSecs> |
|---|---|
| Example: | : MSP SEND TMO 10010 20 |
| Default | : 10 |
| Possible Values | : any non zero positive value. |

-continued

| | |
|---|---|
| Messages | : If no argument is specified or the specified argument is invalid, the current value is displayed, otherwise the new value is displayed and MSP_PROBE_SEND_TIMEOUT for the specified group is set to the new value. |

| | |
|---|---|
| Command | : MSP WAIT TMO |
| Description | : |

Used to set the maximum wait time for receipt of a probe packet. This command changes the value of MSP_PROBE_WAIT_TIMEOUT variable for a specified group, if there is a valid argument. MSP waits for MSP_PROBE_WAIT_TIMEOUT seconds before marking the board "IN_ACTIVE" when the board is in WAIT_MODE and MSP has not detected any status change.

| | |
|---|---|
| Format | : MSP WAIT TMO <SlotNo><ValueInSecs> |
| Example: | : MSP WAIT TMO 10010 2 |
| Default | : 1 |
| Possible Values | : any non zero positive value. |
| Messages | : If no argument is specified or the specified argument is invalid, the current value is displayed. Otherwise the new value is displayed and MSP_PROBE_WAIT_TIMEOUT for the specified group is set to the new value. |

| | |
|---|---|
| Command | : MSP RETRY COUNT |
| Description | : |

Used to set maximum number of probe retry count. This command changes the value of MAX_PROBE_RETRY variable, if there is a valid argument.

When probe packet fails to appear at the receive end, MSP will resend the probe packet until the retry count of MAX_PROBE_RETRY+1 is reached. After reaching this limit, MSP puts the board in WAIT_MODE.

| | |
|---|---|
| Format | : MSP RETRY COUNT <noOfRetries> |
| Example: | : MSP RETRY COUNT 2 |
| Default | : 1 |
| Possible Values | : any non zero positive value. |
| Messages | : If no argument is specified or the specified argument is invalid, the current value is displayed, otherwise the new value is displayed and MSP_PROBE_RETRY is set to the new value. |

| | |
|---|---|
| Command | : MSP HELP |
| Description | : |

Displays all the supported commands recognized by MSP.

| | |
|---|---|
| Format | : MSP HELP |
| Example: | : MSP HELP |
| Command | : MSP NAMEBIND |
| Description | : |

Used for creating a multispan group by specifying logical names associated with primary and secondary NICs.

| | |
|---|---|
| Format | : MSP NAMEBIND PrimaryLName SecondaryLname |
| Example: | : MSP NAMEBIND primary_8022 secondary_8022 |
| Default | : None |
| Messages | : |

For all successful creation of group, MSP displays "Group has been created for Primary Slot # xxxx and Frame_Type:yyyy".

If there is a group already present, MSP displays error message "Group Already Present". MSP displays "failed to create a group", if multispan is unable to create group for atleast one frame type supported by the NIC.

Error Conditions:
1. there is no valid board for the name specified.
2. primary does not have any bound protocol stack
3. secondary has a protocol stack bound
4. Link intergrity check failed

| | |
|---|---|
| Command | : MSP PROBE INTERVAL |
| Description | : |

To set the inter probe packet delay. This command changes the value AES Wakeup Delay if there is a valid argument.

This value gets effective only when the AESCallBack procedure makes a call to the server to reschedule another AES event. This mainly affects the interval at which successive probe packets are sent on the same board. If the delay is longer, MSP might take more time to recognize the adapter failure or link failure.

| | |
|---|---|
| Format | : MSP PROBE INTERVAL <inTicks> |
| Example: | : MSP PROBE INTERVAL 60 |
| Default | : 18 (one second) |
| Possible Values | : any non zero positive value. |
| Messages | : If no argument is specified or the specified argument is invalid, the current value is displayed, otherwise the new value is displayed. |

| | |
|---|---|
| Command | : MSP LOAD SHARING (Not Applicable for OEM) |
| Description | : |

To turn load sharing mode on or off. MSP load shares the outbound LAN traffic only if load sharing mode is ON. MSP load shares transmits only.

| | |
|---|---|
| Format | : MSP LOAD SHARING |
| Example: | : MSP LOAD SHARING |
| Default | : On |
| Messages | : Current state of the load sharing is displayed. |
| Command | : MSP RECEIVE TMO |
| Description | : |

To set the timeout value for receiving probe packet when sent from one board to another. This command changes the value MSP_RECEIVE_PROBE_TIMEOUT if there is a valid argument. The idea of providing this to satisfy variety of switches.

| | |
|---|---|
| Format | : MSP RECEIVE TMO <slotNo><inTicks> |
| Example: | : MSP RECEIVE TMO 10002 18 |
| Default | : 1 tick for Ethernet and FDDI. 18 ticks for Token-Ring. |
| Possible Values | : any non zero positive value. |
| Messages | : If no argument is specified or the specified argument is invalid, the current value is displayed, otherwise the new value is displayed. slotNo can be a hexadecimal value. | the current value is displayed, otherwise the new value is displayed. slotNo can be a hexadecimal value.

| | |
|---|---|
| Format | : MSP DISPLAY STATUS <slotNo> |
| Example: | : MSP DISPLAY STATUS 10002 |
| Messages | : slotNo is optional. If the slotNo is not specified, MSP displays information for all the groups it knows about, otherwise only for slotNo is displayed on the console. |

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 11:
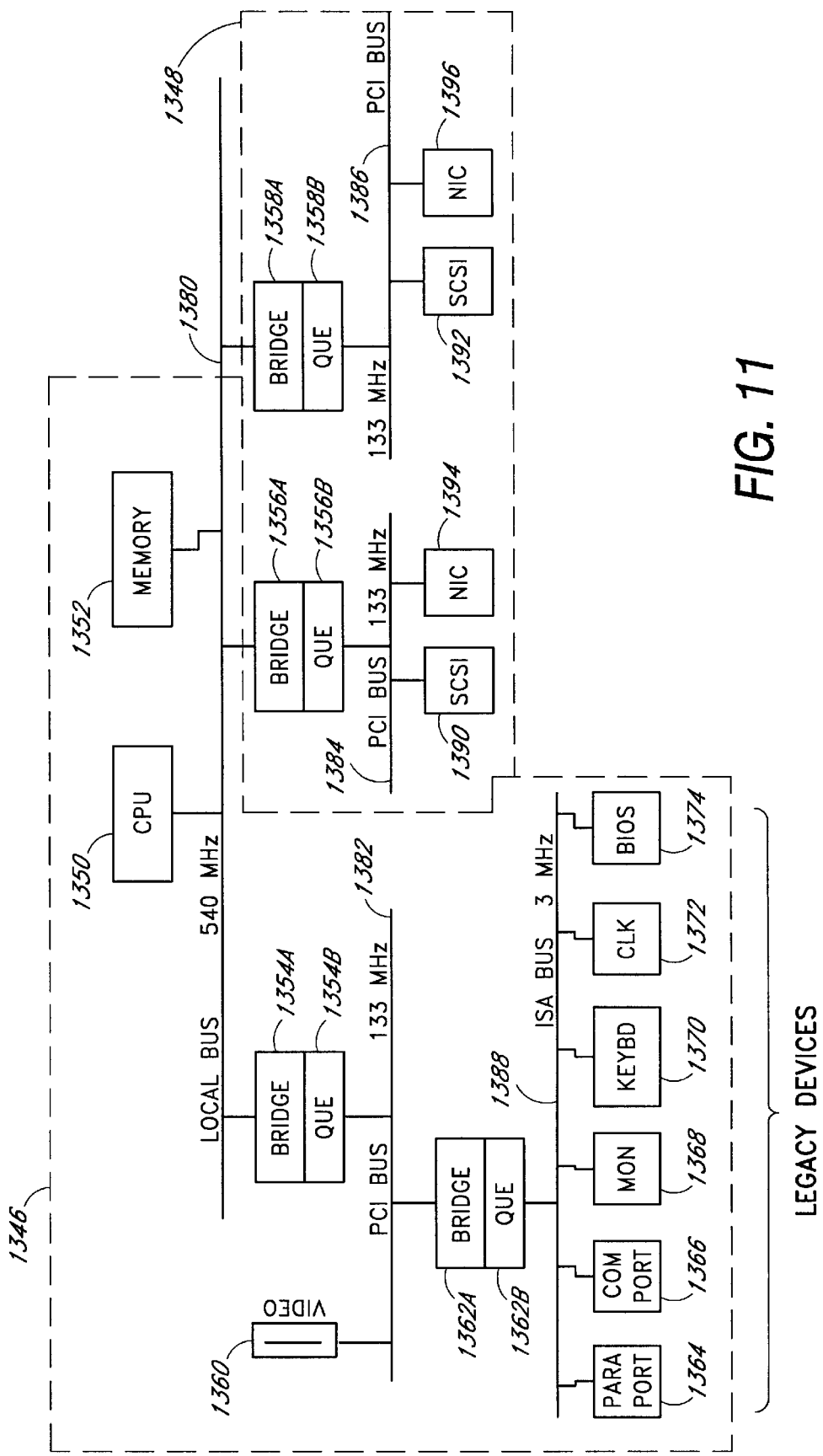
FIG. 11 is a hardware block diagram of a server with a legacy backbone 46 and a mirrored block 48.

FIG. 11 is a hardware block diagram of a server with a legacy block 1346 and dual mirrored block 1348. In this embodiment, the server is an Intel archetecture server. The legacy block maintains backward compatibility via an Industry Standard Architecture (ISA) bus with devices such as the keyboard, monitor, ports, and Basic Input/Output System (BIOS), a.k.a. the legacy components. These devices are identified as legacy components because their operation was part of the original IBM® PC specification defined in 1982. Forward compatibility with new high speed devices is provided via dual mirrored block 1348. This block includes redundant: bridges, busses, and devices; all capable of supporting high speed communications between the CPU 1350 and the devices. The performance of the dual mirrored block is unimpeded by slow speed legacy traffic which is handled in the legacy block.

The legacy block 1346 includes: CPU 1350, memory 1352, bridge-queue 1354A-B video/graphics card 1360, bridge-queue 1362A-B, parallel port 1364, communications port 1366, monitor 1368, keyboard 1370, system clock 1372 and bios 1374. The CPU and memory are connected to a system bus 1380 which operates at 66 MHz. Bridge-que 1354A-B connects system bus 1380 to a peripheral component interface (PCI) bus 1382. The PCI bus operates at 33 MHz. The video/graphics card 1360 is connected to the PCI bus 1382. The PCI bus 1382 is connected to the industry standard architecture (ISA) bus 1388 via bridge-que 1362A-B. The ISA bus 1388 operates at 6 MHz. The remaining legacy devices 1364–1374 are all directly connected to the ISA bus.

The ISA bus operates at a fraction of a percent of the speed of either the PCI bus or the system bus. The Windows® 3.x, 95, NT operating systems all support the legacy devices. All communications between CPU 1350 and any of the legacy devices 1364–1374 pass from the ISA bus via the PCI bus onto the system bus. A considerable portion of the traffic on the PCI bus 1382 traffic is devoted to the legacy devices. It is therefore inappropriate to attach high speed devices to PCI bus 1382 because its operation is impeded by slow speed traffic to/from the ISA bus 1388. High speed devices are better handled in either one or both of the PCI busses 1384–1386 of the dual mirrored block 1348. The dual mirrored block allows high bandwidth communications between the CPU 1350 and peripheral devices such as a small computer storage interface (SCSI) or Network Interface Controller (NIC) cards. The dual mirrored block also allows load balancing of Network traffic as will be described in greater detail with respect to FIGS. 1–10. Additionally, the dual mirrored block allows for a failure of either mirrored block without impairing the operation of the remaining mirrored block.

In the embodiment shown in FIG. 11, mirrored block 1348 includes: bridge-ques 1356A-B, 1358A-B, (SCSI) devices 1390–1392, NMCs 1394–1396 and PCI busses 1384–1386. A PCI bus 1384 is connected via bridge-que 1356A-B to system bus 1380. SCSI device 1390 and NIC 1394 are connected to PCI bus 1384. PCI bus 1386 is connected to system bus 1380 via bridge-que 1358A-B. SCSI device 1392 and NIC device 1396 are connected to PCI bus 1386. Both PCI buses 1384–1386 operate at 133 MHz.

In operation, communication between the legacy devices 1364–1374 and CPU 1350 passes via bridge-queues 1354A-B, 1362A-B from the ISA bus 1388 to the system bus 1380 via PCI bus 1382. All high speed traffic from the SCSI and NIC devices is handled by either or both of PCI buses 1384–1386. Neither of these buses handles legacy traffic. Therefore their performance is unimpaired. Additionally, server down time is greatly reduced by redundancy at the bridge, bus, and device level. Bridge 1356A, PCI bus 1384, SCSI 1390 and NIC 1394, are mirror images of bridge 1358A, PCI bus 1386, SCSI 1392 and NIC 1396.

Thus, the architecture of the mirrored block 1348 allows an individual component at either the device level, the bus level or the bridge level to fail without affecting the operability of the server. Furthermore, because communications between the CPU and any of the legacy devices does not pass via either of the mirrored PCI buses 1384–1386, those mirrored buses handle only high speed traffic, and thus can provide more throughput to/from the SCSI and NIC devices. Additionally, the symmetry of the mirrored block allows load balancing to be implemented.

Figure 12:
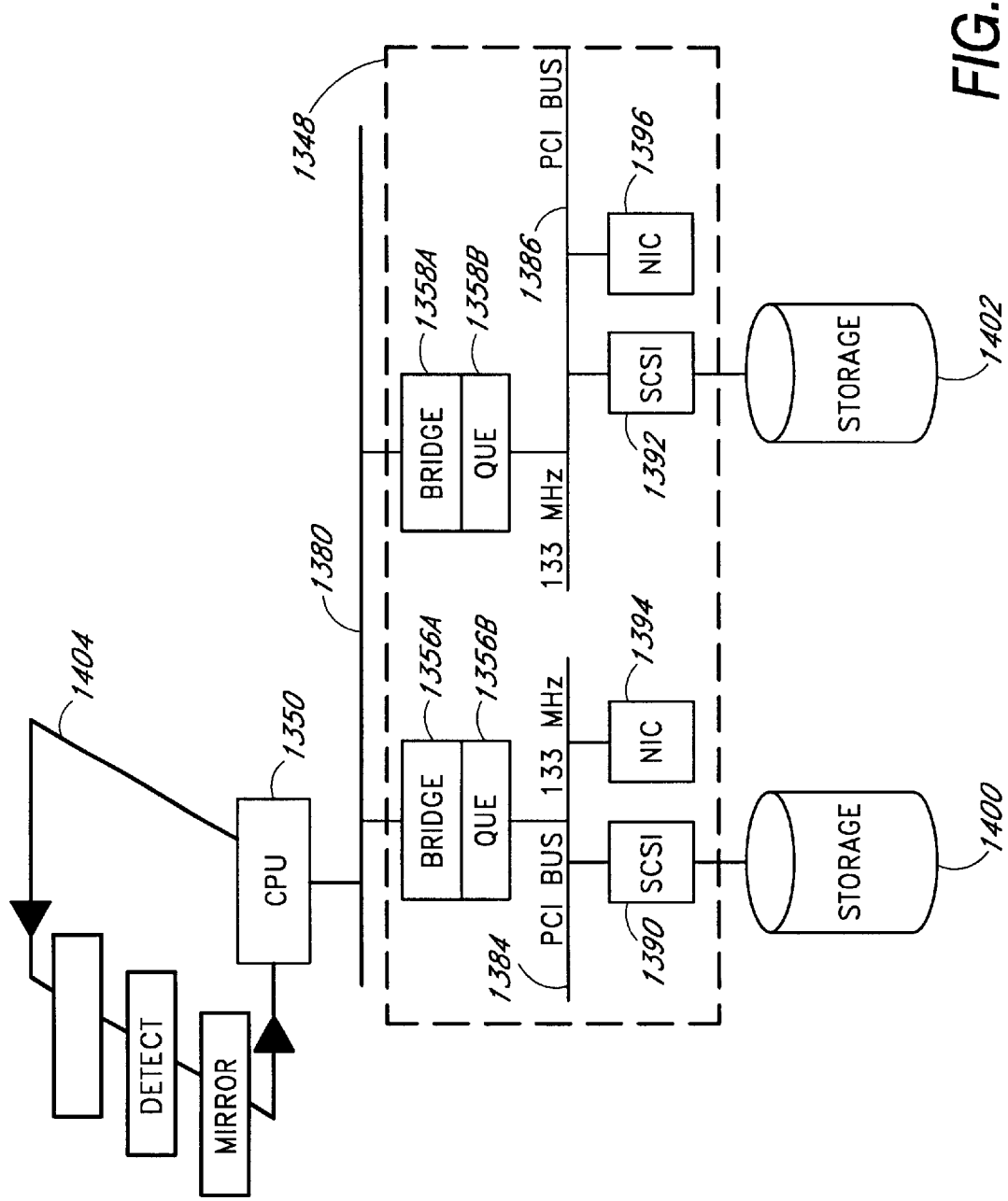
FIG. 12 shows an embodiment of the dual I/O buses with redundant storage links.

FIG. 12 shows an embodiment of the dual mirrored buses in which mirrored data storage is supported. FIG. 12 shows the system bus 1380 connected to the mirrored block 1348 via bridge-ques 1356A-B and 1358A-B. Storage device 1400 is connected to SCSI device 1390. Storage device 1402 is connected to SCSI device 1392.

In operation, data mirroring is accomplished by the mirroring portion of mirror and failure detection processes 1404 operating on CPU 1350. These processes are implemented in industry standard operating systems, such as Novell Netware® and Microsoft Windows NT®. In an embodiment of the invention the mirroring portion of the processes 1404 causes identical data to be stored on each of storage devices 1400–1402. Mirroring is implemented by CPU 1350, which directs data Writes to both storage unit 1400 and storage unit 1402. Thus, a memory access request to "Write" request is passed via bridge-queue 1356A-B, PCI bus 1384, SCSI device 1390 to storage unit 1400. The same "Write" memory access request is also passed via bridge-que 1358A-B, PCI bus 1386, SCSI device 1390 to storage unit 1402. In this embodiment, the write requests are routed through mirrored hardware paths to mirrored storage devices.

Memory access "Read" requests may be passed to either one of storage devices 1400 and 1402, thus improving data throughput. While one "Read" request directed to storage device 1400 is being placed in queue 1356-B another memory access "Read" data can be transferred from queue 1358-B via bridge 1358A to CPU 1350 via system bus 1380. When many read requests are directed to the storage devices, a hardware embodiment which provides independent high speed paths to memory may provide much better throughput that a prior art dual PCI bus computer system where, at best, one of the paths must be shared with the legacy ISA bus.

Detection and fail-over is accomplished by the failure portion of processes 1404 operating on CPU 1350. Traffic from bridges 1356A and 1358A is constantly monitored. When it is interrupted there is a failure of either a bridge-que, a PCI bus, a SCSI device or the storage unit itself on either of the mirrored blocks. When the failure is detected failover is implemented. Failover is accomplished by terminating mirrored writes, and instead writing and reading from the remaining accessible storage device, i.e., device 1400 or 1402. The remaining bridge, bus, and SCSI portion of mirrored block 1348 can continue to provide the data storage function without requiring down time on the server. Furthermore, if the mirrored blocks are designed in such a way as to support hot-swapping, the SCSI and/or storage device can be replaced without requiring server down time.

Figure 13:
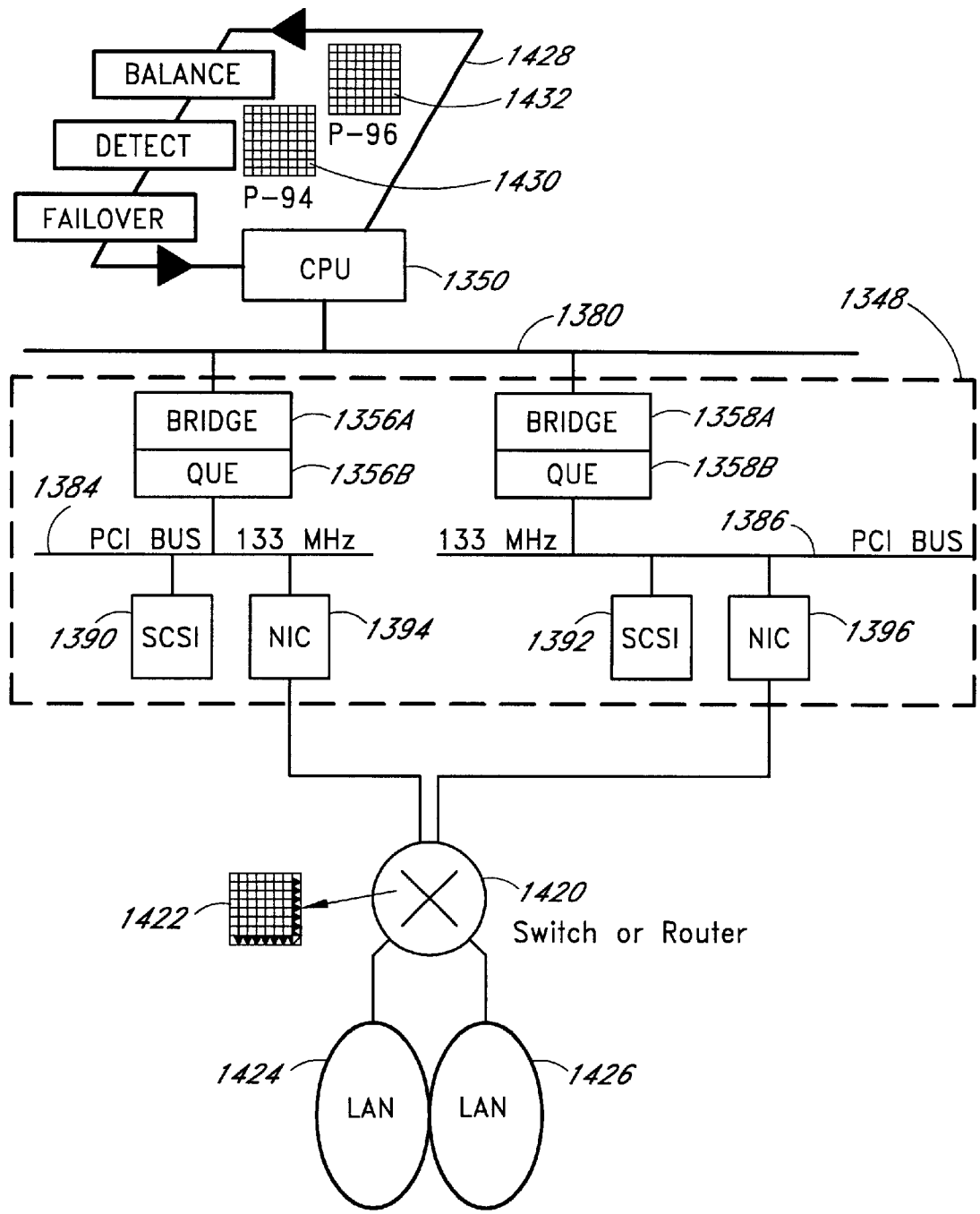
FIG. 13 show the dual I/O buses with redundant network links.

FIG. 13 shows an embodiment of the dual mirrored block architecture utilized for both load balancing and fail over of network traffic. The dual mirrored block 1348 is shown. Additionally, switch 1420, and Local Area Network (LAN) segments 1424–1426 are shown. NICs 1394 and 1396 are connected to individual ports of switch 1420. Switch 1420 may include a routing table 1422. Processes 1428 for load balancing, failure detection and fail over are shown. These processes include protocol stacks 1430–1432 for respectively NICs 1394–1396.

When both bridge bus and device portions of mirrored block 1348 are operational, load balancing is performed in the following manner. Incoming traffic from either LAN segment is tagged with a destination Medium Access Control (MAC) address. Each NIC has a unique MAC address. Switch 1420 routes incoming packets to whichever of NICs 1394–1396 has a MAC address matching the destination address of the packet. Each NIC has associated with it a pair of protocol stacks. Each stack processes packets in first in first out (FIFO) order. One of each pair handles incoming packets while the other handles outgoing packets.

Load balancing of incoming packets are normally subject to the following processes broadly defined as packet processing of incoming packets. These processes include: removing the MAC header including the destination MAC address, performing any decryption or decompression on the payload, and processing the command, query, or response that is contained in the payload. If, for example, the server is performing as a database server, incoming packets might contain payloads with querys. These would be passed after packet processing to the database engine which would retrieve appropriate records from the database. Packet processing is processor intensive activity. Packet processing is traditionally handled by a dedicated processor on each NIC. Traditionally, once a packet is routed by a switch such as switch 1420, that packet ends up in the corresponding one of protocol stack pairs 1430–1432 associated with the receiving NIC, e.g., either NIC 1394 or 1396. The current invention provides processes for balancing incoming and outgoing network traffic between the packet processors. These processes 1428 monitor the size of incoming and outgoing traffic in each of the protocol stack pairs and balance the load between processors, to minimize delay and maximize throughput. If an imbalance of incoming traffic is detected, i.e., if the incoming portion of the protocol stack pair 1430 is longer than the incoming portion of protocol stack pair 1432, then the next incoming packet for protocol stack pair 1430 is sent instead to the incoming portion of protocol stack pair 1432. This re-routing is accomplished at the MAC level, i.e., before packet processing has commenced. The MAC address in the header is changed and the packet is received and processed by the less heavily loaded processor. These processes will be discussed in greater detail in the following FIGS. 1–10. This rerouting is performed transparently in what the traditional Open Systems Interconnection Reference Model (Day and Zimmerman, 1983) (OSI) characterizes as the data link layer.

Load balancing of outgoing packets are normally subject to the following processes broadly defined as packet processing of outgoing packets. These processes include: performing any encryption or compression on the payload including the source and destination address, and wrapping the payload with a header including a destination MAC address. Normally the processing portion of the NIC which receives a packet handles the processing of the response packet as well. In the current invention this is not necessarily the case. Outgoing traffic from the server, to the LANs is also subject to load balancing. If, for example the server is performing as a database server, outgoing packets might contain payloads with records which match a query. These records would be passed to the receiving NIC for outbound processing: including encryption, compression, and wrapping. The packets would be processed in FIFO order from the outgoing portion of the protocol stack pair of the receiving NIC, e.g., either stack pairs 1430 or 1432. Packet processing is processor intensive activity. The outgoing portion of protocol stack pairs can also be impalanced. The current invention provides processes 1428 for detecting outgoing stack imbalance, and rerouting the next outgoing packet to whichever of the outgoing portion of protocol stack pairs 1430–1432 is shorter in size, to minimize delay and maximize throughput. This re-routing is accomplished at the MAC level, i.e., before packet processing has commenced. The MAC address in the header is changed and the packet is received and processed by the less heavily loaded processor. These processes will be discussed in greater detail in the following FIGS. 1–10. This rerouting is performed transparently in what the traditional Open Systems Interconnection Reference Model (Day and Zimmerman, 1983) (OSI) characterizes as the data link layer.

Detection and fail-over is accomplished by the failure portion of processes 1428 operating on CPU 1350. Traffic from bridges 1356A and 1358A is constantly monitored. If there is a failure of either a bridge-que, a PCI bus, a NICdevice on either portion of the mirrored blocks, traffic is interrupted and the interruption is detected. When the failure is detected failover is implemented. Failover is accomplished by terminating communications with the unreachable/failed NIC. Traffic is directed to the remaining NIC(s). If there is more than one, load balancing is implemented with the remaining NIC(s). The remaining bridge, bus, and NIC(s) portion of mirrored block 1348 can continue to provide the network interface function without requiring down time on the server. Furthermore, if the mirrored blocks are designed in such a way as to support hot-swapping, the NIC can be replaced without requiring server down time.

As will be obvious to those skilled in the art, more than on NIC may be added to either of buses 1384 and 1386 to further improve system throughput.

Sparse Bridge Mapping

As indicated in the discussion of Plug and Play, each adapter card must be configured. Normally, this configuration is done at boot time by the BIOS, insuring that no adapter card's assigned addresses encroach on those of another adapter card.

PCI defines three address spaces through which devices may communicate: memory space, I/O space and configuration space. Software normally communicates with PCI devices through registers and buffers programmed to respond to specific memory or I/O addresses. The third address space, configuration space, is used by specific system software, such as the BIOS at boot time, to program the memory or I/O addresses the PCI device's registers will respond to. The phrase "configuration of a PCI device" refers to this programming of the device through its configuration space. As was indicated earlier, the memory and I/O address spaces must be managed by the BIOS, and by other system software to properly program adapter cards following a hot swap or hot add operation.

Under PCI, PCI-to-PCI bridges each define trees of subordinate busses. Each bus receives a bus number, Primary Bus Number (608), and each bridge defines the range of bus numbers implemented below it in the tree. The Secondary Bus Number 606 is the bus number of the PCI bus on the other side of the bridge, and the Maximum Subordinate Bus Number 622 is the largest PCI bus number found within the tree below this bridge. This implies that the bus number space is allocated among the bridges such that all buses accessible through a bridge are contiguously numbered, and that the bus number ranges allocated among peer bridges are disjoint.

Each PCI bridge also has two pairs of address registers which define the ranges of memory and I/O addresses (respectively) which this bridge will pass through to subordinate buses. The Memory Base (610) and Memory Limit (612) define the range of memory addresses, and the I/O Limit Upper 16 Bits and I/O Base Upper 16 Bits define a range of I/O addresses. PCI devices attached to the bridge's secondary bus, or to buses subordinate to the secondary bus are assigned memory and I/O address ranges from these two ranges.

Figure 14A:
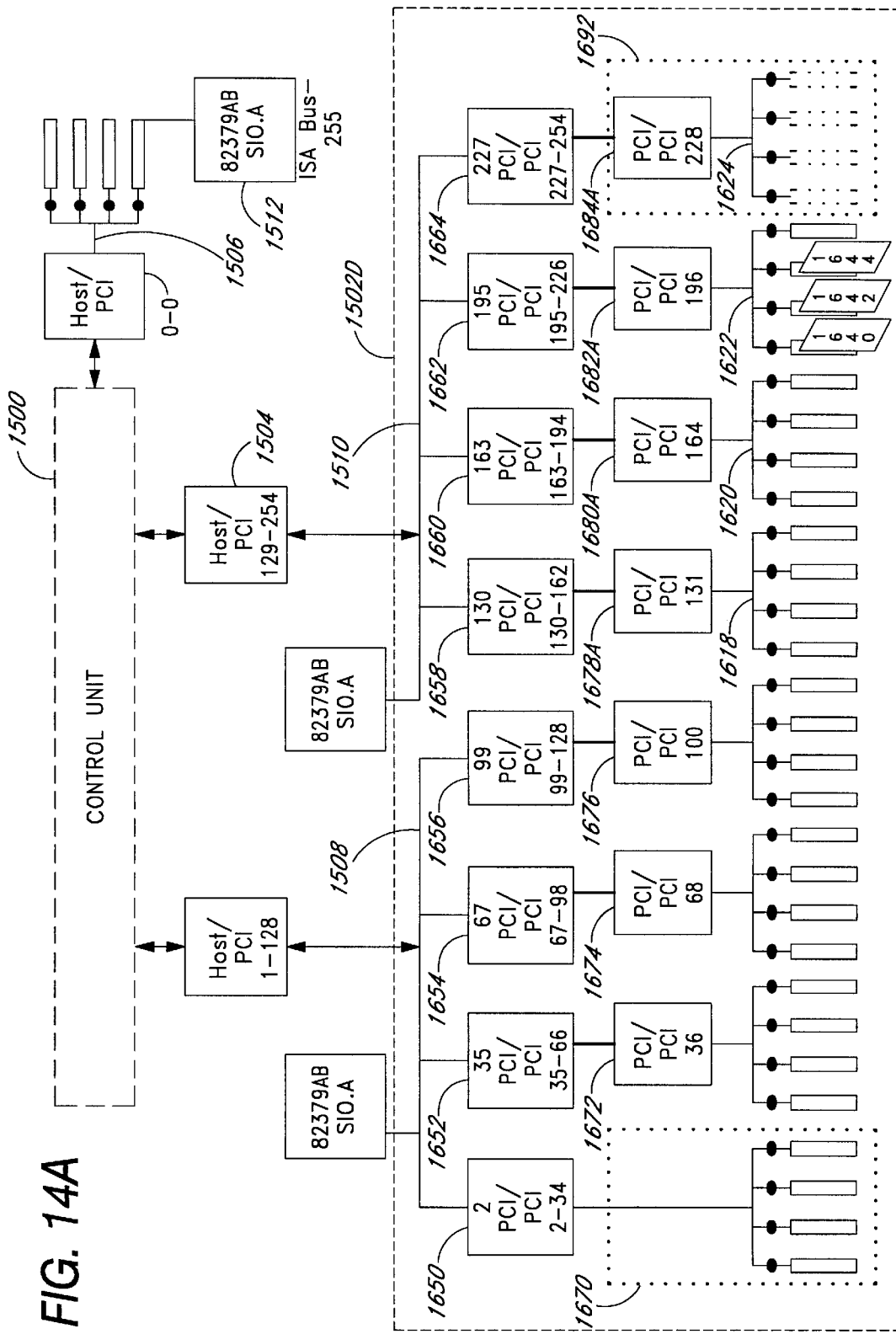
Figure 15:
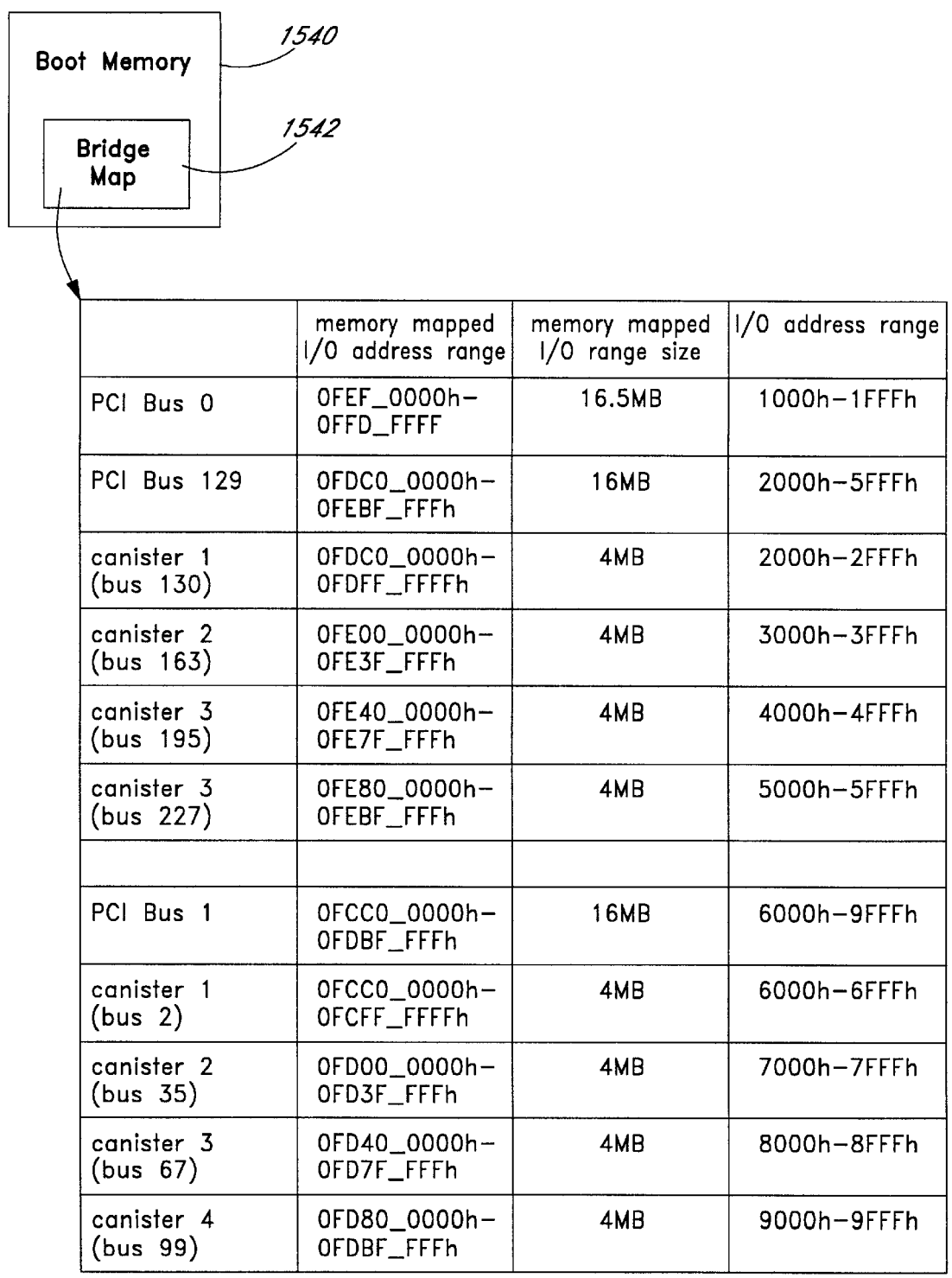
FIG. 15 is a map describing the distribution of address spaces to busses in a hierarchical, multi-PCI bus computer system shown in FIGS. 14A–Ba.

FIGS. 14–15 illustrate a sparse mapping of bus numbers and address ranges. Sparse mapping refers to assigning bus numbers and address ranges sparsely as the buses are scanned at boot time, so that each bridge has a range allocated to it from which new adapter cards and bridges may be allocated bus numbers and address ranges when they are hot added to the computer. This preallocation results from sparse mapping processes 1542 which allocates bus numbers and address ranges according to a sparse map [See FIG. 15] which is contained in boot memory. The sparse mapping processes are executed during booting of the computer system.

FIG. 14A shows an embodiment of an extensible PCI bus hierarchy. The base system features three PCI buses 1506–1510. One bus 1506 is implemented entirely on the motherboard, and is intended to support embedded SCSI and video controllers, and the ISA bus. There are no PCI connectors on this bus. The other two buses 1508–1510 are provided for support of hot pluggable PCI cards. To support this, PCI—PCI bridges are utilized throughout the implementation of these latter two PCI buses.

For a prior art PC system, where the bridges and buses are discovered and assigned statically at boot time, the assignment procedure is a simple top down, left to right traversal of the PCI space, assessing the requirements of each PCI device on the way down, summing them and assigning address ranges, PCI bus numbers and programming the Secondary Bus Number 606, Maximum Subordinate Bus Number 622, base registers 610, 614 and limit registers 612, 616 for each PCI-to-PCI bridge on the way back up. A Plug and Play BIOS normally assigns these values contiguously by scanning all buses, PCI-to-PCI bridges and adapter cards. In a system where adapter cards, possibly containing PCI-to-PCI bridges themselves may be introduced long after the system booted, this arrangement is inadequate. Such newly introduced devices may not themselves be configurable because no bus numbers or adequate address ranges are available on that PCI bus.

However, where hot adding of PCI cards, devices and bridges is supported, bus numbers and address ranges must be sparsely allocated a priori to allow for addition of bridges during run-time.

PCI Bus Topology for an Intel Embodiment

An embodiment of a PCI-based computer system incorporating the present invention is shown in FIG. 14A. The following discussion assumes an embodiment conforming to Intel MPS 1.4. Other embodiments are possible, including ones conforming to other computer system specifications, such as the CHRP design for PowerPC from Motorola, IBM and Apple Computer.

In FIG. 14A, four backplane connectors (1670–1676, 1678A–1684A) may be provided on each hot pluggable PCI bus (1508, 1510). Each of these is isolated from the PCI bus by an associated bridge (1650–1664). Into each connector may be plugged a canister containing four-PCI slots (1670, for example), card guides and EMI shielding. Hot plugging is accomplished by removing and replacing this canister and any PCI cards in it. This embodiment incorporates one PCI—PCI bridge per four slot canister. There are thus five PCI buses in each of the two hot pluggable bus hierarchies, or ten PCI buses in the base system.

In addition to this passive canister, a second, active type of canister is disclosed. An I/O Processor (IOP) is incorporated in this type of canister which provides local intelligence to service the canister's adapter cards. The IOP may be any processor, including Intel Pentium®, Motorola PowerPC®, Intel 80960. In one embodiment, 1692, the IOP is an Intel 80960RP, which includes, internally, an additional PCI-to-PCI bridge, and support for further isolating the card slots from the computer behind the intelligence provided in the IOP.

Each PCI bus may also include an Intel 82379AB SIO.A chip. For the motherboard PCI bus 1506, this chip provides an ISA bridge, legacy devices such as real time clock, and an 8059A-compatible PCI. This PCI bus is also called the compatibility PCI bus. The I/O Advanced Programmable Interrupt Controller (APIC) portion of this chip is used for forwarding interrupts to the CPU 102. The SIO.A chips associated with the hot pluggable PCI buses are known as I/O APICs, and are initialized such their ISA components are in a passive state. When scanning the PCI buses, the BIOS must be aware that, due to subtractive decode in the 82379AB, the ISA portion of the I/O APICs will respond to all unclaimed I/O accesses.

In an embodiment, the INT A line of each PCI slot may be wired to a separate, PCI-compatible input of the 10 APIC associated with its PCI bus. The remaining INT lines on the PCI buses may be wired to share these inputs to the associated IO APIC. Since each input to an IO APIC may be programmed to invoke a unique ISR when it is asserted to interrupt the CPU, this wiring insures that, when an ISR is invoked, one of only a minimal number of adapter cards may be asserting the interrupt. This, in turn, minimizes the number of devices which the ISR must query before finding the source of the interrupt. In systems where fewer IO APICs are provided, interrupt lines must be shared by many PCI slots, causing the ISR to query more adapter cards to find an interrupting card, and increasing the interrupt service latency.

Another embodiment provides one IO APIC for each four slots. INT lines of the PCI slots are wired each to a separate input of its associated IO APIC. In such an embodiment, each INT line can assert a unique interrupt and invoke a unique ISR, eliminating the need to share interrupts among device functions. In such an embodiment, a multifunction PCI card may have a unique interrupt assigned to each of its functions. The following table illustrates wiring of slot interrupt lines to I/O APICs in one possible embodiment:

ment which utilizes virtual wire mode as APIC interrupts through the APIC of 1512 Variable Interrupt Routing requires that this intervening logic be capable of suppressing presentation of interrupts through these ISA IRQs when running in full APIC or multiprocessor mode.

According to sparse bus mapping, the bus number space is statically partitioned across the maximum number of backplane slots such that each slot is allocated thirty-two bus numbers. In this embodiment, any one canister may have a PCI bus structure below it with, at most, thirty-one subordinate buses.

The bus number space may be allocated more or less equally between the two hot pluggable buses 1508–1510. One of the hot pluggable buses loses a bus number to the compatibility bus 1506 (number zero). The other hot pluggable bus loses one number to the ISA bus (which must be bus 255). Also, each hot pluggable bus hierarchy loses a bus number to the PCI bus implemented on the backplane. The missing bus numbers are removed from the allocation of the last slot on each backplane bus.

In another embodiment shown in FIG. 14A, only the left-most two PCI/PCI bridges and associated slots or canisters on each of the two backplane PCI buses (i.e., bus numbers 2–34, 35–66, 130–162, 163–194) are provided. The bus numbers assigned to the missing slots may be lost (i.e., reserved), or may be allocated among the implemented canisters according to some mapping other than the one described for the present embodiment.

In an embodiment where CPU 102 is an Intel Pentium(r) Pro, three PCI buses are generated by separate Intel 82450GX Orion-PCI-Bridge (OPB) chip sets. Each OPB has two ranges of I/O addresses which can be programmed to be ignored (handled by another bus), or recognized by this bus.

| Bus # | Slot # | 82379AB I/O APIC IRQ | ISA PIC IRQ | Bus # | Slot # | 82379AB I/O APIC IRQ | ISA PIC IRQ | Bus # | ISA Device | ISA PIC IRQ |
|---|---|---|---|---|---|---|---|---|---|---|
| 0 | PCI video | 9 | 9 | | | | | | | |
| 0 | PCI SCSI | 14 | 14 | | | | | | | |
| 2 | 1 | 3 | 10 | 130 | 1 | 3 | 11 | 255 | Timer | 0 |
| | 2 | 4 | 10 | | 2 | 4 | 11 | 255 | Keyboard | 1 |
| | 3 | 5 | 10 | | 3 | 5 | 11 | 255 | Secondary PIC | 2 |
| | 4 | 6 | 10 | | 4 | 6 | 11 | 255 | Com2 | 3 |
| 35 | 1 | | 10 | 163 | 1 | 10 | 11 | 255 | Com1 | 4 |
| | 2 | | 10 | | 2 | 11 | 11 | 255 | LPT2 | 5 |
| | 3 | | 10 | | 3 | 14 | 11 | 255 | Floppy | 6 |
| | 4 | | 10 | | 4 | 15 | 11 | 255 | LPT | 7 |
| 67 | 1 | | 10 | 195 | 1 | 3 | 11 | 255 | RTC | 8 |
| | 2 | | 10 | | 2 | 4 | 11 | 255 | Video | 9 |
| | 3 | | 10 | | 3 | 5 | 11 | 255 | PCI Bus 1 (*) | 10 |
| | 4 | | 10 | | 4 | 6 | 11 | 255 | PCI bus 129 (*) | 11 |
| 99 | 1 | | 10 | 227 | 1 | 10 | 11 | 255 | Mouse | 12 |
| | 2 | | 10 | | 2 | 11 | 11 | 255 | Math Error | 13 |
| | 3 | | 10 | | 3 | 14 | 11 | 255 | SCSI | 14 |
| | 4 | | 10 | | 4 | 15 | 11 | 255 | CDM | 15 |

(*) ISA IRQs for PCI Bus 1 and PCI Bus 129 must be disabled when in full APIC mode.

In an embodiment, the BIOS may initialize the interrupt system in Virtual-Wire mode before initializing any devices (see Intel MPS 1.4 for a description of virtual wire mode).

For an embodiment conforming to Intel MPS 1.4 Variable Interrupt Routing, the INT lines of all PCI slots of PCI buses 1508 and 1510 are also routed, through intervening logic, to inputs of the motherboard SIO chip's 8059A. In uniprocessor mode, these interrupts may be presented through the 8059A of 1512 as ISA interrupts, or in another embodi- The SIO chip implements a number of ISA devices, ranging from the old AT motherboard devices (RTC, floppy) at port addresses below 100h, to serial controllers at port ranges above 300h. The two OPB registers don't provide enough granularity to allocate portions of the ISA port address range among the OPBs In the embodiment shown in FIG. 14A, all legacy ISA devices are realized on the primary PCI bus, though the chip 1512 and associated external logic chip (serial, parallel, RTC, keyboard, etc.), as are an S3-based PCI video controller, and a PCI fast/wide SCSI controller. The legacy devices span the entire ISA range as shown in the following table.

| I/O Address Range | Reserved for: |
|---|---|
| 0000h-00ffh | PC/AT-compatible motherboard devices |
| 0100h-03ffh | ISA-compatible cards |
| 0400-04ffh | EISA motherboard I/O devices |
| 0500-7ffh | ISA I/O devices |
| 0800h-08ffffh | EISA motherboard I/O devices |
| 0900h-0bffh | ISA I/O devices |
| 0c00h-0cffh | EISA motherboard I/O devices |
| 0d00h-0ffh | ISA I/O devices |
| 1000h-ffffh | 15 EISA cards, x000h-xfffh per card |

Most ISA devices, as well as the PCI video and SCSI controllers, use ports in the range of 0100h–03ffh.

In an embodiment having multiple OPBs, the compatibility OPB (i.e., the one which has the ISA bridge associated with it) decodes all I/O references except those specifically disabled by the I/O Space Range registers (pp. 64–65 of the Intel OPB spec "82450 GX/KX PCISETS EDS", rev 2.3). The other OPBs will not decode any I/O references unless they are specifically enabled by these same registers. Further, the OPB will always alias I/O references to ISA I/O ports by masking the upper 16 bits of a 32 bit port address, passing only the low 16 bits (i.e., wrapping the addresses into the 64KB ISA I/O space). The PCI Decode Mode register provides some deviation from this decode procedure. The overall affect of this is to limit the I/O range available in to 64KB, limiting the space available for partitioning to each PCI bus.

The Intel MP Spec (1.4) defines three regions of the x86 address space as available for memory mapped I/O. Since the OPBs may implement subtractive decode (they will decode references to any address to which no one else responds), each OPB must be told which memory ranges it is to decode for I/O mapping, and which it is not (more correctly, each OPB is told which gaps in the x86 address space it should ignore). Since there are only two such memory gap registers in the OPB, the three ranges of memory mapped I/O addresses must be carved out of, at most, two contiguous address ranges.

In one embodiment, we define a 16 MB range for each PCI bus. The compatibility bus 1506 uses the upper most 16 MB range (0FEF0_0000h-0FFD_FFFFh). Of this space, 1 MB will be reserved for a SCSI controller, and 8 MB for a video controller. The remaining 7 MB is available for future expansion. For the two remaining PCI buses 1508–1510, 32 MB is allocated and divided equally between the two buses immediately below the I/O APIC range (0FCE0_0000H-0FDDF_FFFFh and 0FDE0_0000h-0FDF_FFFFh, for bus 129 and bus 1, respectively).

It is possible that a hot added PCI card may require more memory space than is left in bus' allocation. In one embodiment of the current invention, this condition may result in a configuration error, and the card will not be initialized. In such a situation, the offending card may be moved to another PCI bus or canister which has enough space remaining in its allocation. In another embodiment of the current invention, configuration software support may be provided which will scan the current configuration and allocated resources and suggest where to place the new card. In a third embodiment, existing address assignments may be adjusted to accommodate the new card.

PCI Configuration space is defined to be 64 double words for each PCI device function (i.e., for each of up to eight functions which each PCI device may support). The bus number, device and function are implicit in the 32-bit configuration address so no allocation or rationing of this space is needed. The boot memory 116 may maintain a database of buses, bridges and PCI devices and their addresses such as that shown in FIG. 15. Representation of this information may be designed such that the database may be edited, and queried through standard PC APIs (e.g., DMF, Card Services).

In an embodiment, as shown in FIG. 15, 4 KB of I/O address space is reserved for the compatibility PCI bus and each canister by using the I/O ranges assigned to EISA, Since no support is provided for the EISA bus.

The following sections outline the requirements of NetWare® by Novell Inc. of Orem Utah, Windows® NT by Microsoft of Redmond Wash. and of the sparse bridge mapping processes 118 which are part of the boot memory 116 BIOS, with respect to routing of PCI interrupts and interrupt management. [See *PCI System Architecture*, Tom Shanley and Don Anderson, 1995, MindShare, Inc, ISBN: 0-201-40993-3 and from the Intel MPS Specification (Version 1.4), Appendix D each of which is incorporated herein by reference as if fully set forth herein.

NetWare® provides support for up to four PCI buses, and 64 PCI interrupt vectors. PCI interrupts are assumed to be routed through an I/O APIC, where each PCI interrupt may be separately mapped to an IRQ. NetWare provides all APIC programming, as long as the design includes an Intel I/O APIC. Novell would like the APICs to be I/O mapped. NetWare also requires that individual PCI interrupts be "peeled" away from the ISA interrupt controller, and rerouted as full APIC interrupts.

NetWare expects the BIOS to provide a table compatible with MPS 1.4. NetWare does not perform its own PCI discovery, and makes no assumptions about the MPS 1.4 table being static.

NetWare supports a variety of PCI controller cards which can be accessed via the ISA IO Port space, as well as being accessible as PCI devices. NetWare requires that these cards support currently shipping legacy drivers, wherever the cards are plugged in. This requires that two hot pluggable buses 1508–1510 [see FIG. 14A] be mapped into the ISA IO space, and the ISA IRQ space, as well as being treated as peer PCI buses (i.e., they must be dual mode).

Windows NT® requires the BIOS to have built an MPS table, compliant with the MPS 1.4 spec. NT does not rescan the PCI bus, and does not rebuild the table.

In the Intel Pentium Pro embodiment described above, the MP configuration table is be positioned in read/write memory, and completed to reflect the actual buses, devices, and address assignments. Devices in the table which are not present, or not functional, are either removed from the table, or flagged as not functioning.

A Floating Pointer Structure and MP Configuration Table may provided. The MP Configuration Table will be large (4600 bytes or larger), and so must be implemented at the top of extended memory. The entire maximum topology of the embodiment being described in reference to FIG. 14A may be reflected in the following OEM configuration table, including both 82379AB I/O APICs and 80960RPs. This may be done in order to accommodate hot adding of components. If external bridge components are dynamically added, the Configuration Table will have to be edited and rewritten, so that entries appear in the right order.

The following is an OEM Configuration Table which may be used to connect to the configuration database shown in FIG. 15.

| | Code | Length (bytes) | count in table | comments |
|---|---|---|---|---|
| Processor | 0 | 20 | 4 | |
| Bus | 1 | 8 | 256 | |
| I/O APIC | 2 | 8 | 9 | |
| I/O Interrupt | 3 | 8 | 15 | ISA ints |
| | 3 | 8 | 128 | pluggable w/o 80960RP |
| | 3 | 8 | 128 | pluggable w/80960RP |
| Sys Addr Mapping | 128 | 8 | 3 | |
| Bus Hierarchy | 129 | 8 | 17 | |
| Compat. Bus Mapping | 130 | 8 | 1 | |

In FIG. 14B a detailed view of bridges 1678A–1684A is shown. These bridges are initially set forth in FIG. 14A. Control unit 1500, primary bridge 1504A and swap/add unit 1502 are shown. Bridge 1504A includes configuration register 1504B. Swap/add unit 1502 includes bridges 1678A–1684A, canisters 1618–1622, power switch 1524 and LEDs 1630–1636. Each of bridges 1678A–1684A includes respectively, control registers 1678B–1684B. Canister 1622 includes adapter cards 1640–1644. Control unit 1500 is connected via bridge 1504A to bus 1510. Bridges 1678A–1684A each connect via intermediate bridges [see FIG. 14A] to primary bus 1510. Canisters 1618–1622 each connect to bridges 1678A–1682A. Bridge 1684A is not connected to a canister. Canisters 1618–1622 each include four slots for peripheral cards. Canister 1622 includes cards 1640–1644 in three of its four available slots. Bridge 1684A is configured to accept a canister referenced as 1624 but in the example shown does not contain such a canister.

Power control 1524 is connected via signal lines 1520 and 1522 to bus 1510. Power control 1524 is also connected to power lines 1526. Power control is connected via signal lines 1628 to each of LEDs 1630–1636 associated with, respectively, canisters 1618–1622 and interface 1624. Power control 1524 is also connected via individual power lines 1626 to each, respectively, of canisters 1618–1622 and to canister slot 1624.

In order to implement a Hot-Add environment in a PCI architecture each of bridges 1504A and 1678A–1684A may be configured to reserve sufficient address space not only to support those peripheral devices physically present in the system but also to support those devices which might be added to this system after boot-up. In the example shown in FIG. 14B the only devices physically present at boot-up are bridges 1504A and 1678A–1684A and peripheral devices 1640–1644. Nevertheless, a sparse map similar to that discussed above in connection with FIG. 15 may, for example, require each bridge to reserve 4 MB per canister. The sparse map is contained in boot memory 1540. Sparse bridge mapping processes, which may be included as part of the system BIOS, configure the computer on power up in accordance with the speculative bridge map. The bridge mapping code 1542 stored in boot memory 1540 may cause the processor 102 to write to the configuration registers of bridges 1678A–1684A and 1504A a range of addresses similar to those present in the table shown in FIG. 15. The reserved address range may be greater than required by the actual physical devices on the secondary side of each bridge.

GLOSSARY

Fault-Tolerance: A computer system is fault-tolerant when it has the ability to continue operation despite the failure of one or more individual elements.

Redundancy: To implement fault-tolerance system components and data pathways are duplicated or mirrored in order to provide primary and backup components and data pathways.

Fault-Detection: A fault-tolerant system includes the ability to detect a failure in any of its components.

Fail-Over: A fault-tolerant system includes the ability to transition operational control from components that have failed to components that remain operational.

Load Sharing: In a computer system with redundant components, load sharing is implemented by controlling the data flow through one or another of at least two redundant operational data paths in order to maximize throughput.

Processor: Refers to any combination of processors on the system bus, on an IO bus, or within peripheral devices such as NICs. The processors may be any conventional general purpose single- or multi-chip microprocessor such as a Pentium processor, a Pentium Pro processor, a 8051 processor, a MIPS processor, a Power PC processor, or an Alpha processor. In addition, the processor may be any conventional special purpose processor such as a digital signal processor or a graphics processor, or network interface packet processor operating individually or in combination.

Program Code: Processing is implemented with a series of conditional instructions which collectively are referred to as program code. The program code may be stored in a memory or embedded in a logic unit.

Memory: Includes physical medium for storage of data either permanently or temporarily.

The foregoing description of embodiments of the invention have been presented for purposes of illustration and description only. They are not intended to be exhaustive or to limit the invention to the forms disclosed. Obviously, many modifications and variations will be apparent to practitioners skilled in the art.

Appendix A

Incorporation by Reference of Commonly Owned Applications

The following patent applications, commonly owned and filed OCT. 1, 1997, are hereby incorporated herein in their entirety by reference thereto:

| Title | Application No. | Attorney | Docket No. |
|---|---|---|---|
| "System Architecture for Remote Access and Control of Environmental Management" | 08/942,160 | 02A1 | MNFRAME.0 |
| "Method of Remote Access and Control of Environmental Management" | 08/942,215 | 02A2 | MNFRAME.0 |
| "System for Independent Powering of Diagnostic Processes on a Computer System" | 08/942,410 | 02A3 | MNFRAME.0 |
| "Method of Independent Powering of Diagnostic Processes on a Computer System" | 08/942,320 | 02A4 | MNFRAME.0 |
| "Diagnostic and Managing Distributed Processor System" | 08/942,402 | 05A1 | MNFRAME.0 |
| "Method for Managing a Distributed Processor System" | 08/942,448 | 05A2 | MNFRAME.0 |

-continued

| Title | Application No. | Attorney Docket No. | |
|---|---|---|---|
| "System for Mapping Environmental Resources to Memory for Program Access" | 08/942,222 | 05A3 | MNFRAME.0 |
| "Method for Mapping Environmental Resources to Memory for Program Access" | 08/942,214 | 05A4 | MNFRAME.0 |
| "Hot Add of Devices Software Architecture" | 08/942,309 | 06A1 | MNFRAME.0 |
| "Method for The Hot Add of Devices" | 08/942,306 | 06A2 | MNFRAME.0 |
| "Hot Swap of Devices Software Architecture" | 08/942,311 | 06A3 | MNFRAME.0 |
| "Method for The Hot Swap of Devices" | 08/942,457 | 06A4 | MNFRAME.0 |
| "Method for the Hot Add of a Network Adapter on a System Including a Dynamically Loaded Adapter Driver" | 08/943,072 | 06A5 | MNFRAME.0 |
| "Method for the Hot Add of a Mass Storage Adapter on a System Including a Statically Loaded Adapter Driver" | 08/942,069 | 06A6 | MNFRAME.0 |
| "Method for the Hot Add of a Network Adapter on a System Including a Statically Loaded Adapter Driver" | 08/942,465 | 06A7 | MNFRAME.0 |
| "Method for the Hot Add of a Mass Storage Adapter on a System Including a Dynamically Loaded Adapter Driver" | 09/862,963 | 06A8 | MNFRAME.0 |
| "Method for the Hot Swap of a Network Adapter on a System Including a Dynamically Loaded Adapter Driver" | 08/943,078 | 06A9 | MNFRAME.0 |
| "Method for the Hot Swap of a Mass Storage Adapter on a System Including a Statically Loaded Adapter Driver" | 08/942,336 | 06A10 | MNFRAME.0 |
| "Method for the Hot Swap of a Network Adapter on a System Including a Statically Loaded Adapter Driver" | 08/942,459 | 06A11 | MNFRAME.0 |
| "Method for the Hot Swap of a Mass Storage Adapter on a System Including a Dynamically Loaded Adapter Driver" | 08/942,458 | 06A12 | MNFRAME.0 |
| "Method of Performing an Extensive Diagnostic Test in Conjunction with a BIOS Test Routine" | 08/942,463 | 08A | MNFRAME.0 |
| "Apparatus for Performing an Extensive Diagnostic Test in Conjunction with a BIOS Test Routine" | 08/942,163 | 09A | MNFRAME.0 |
| "Configuration Management Method for Hot Adding and Hot Replacing Devices" | 08/941,268 | 10A | MNFRAME.0" |
| "Configuration Management System for Hot Adding and Hot Replacing Devices" | 08/942,408 | 11A | MNFRAME.0" |
| "Apparatus for Interfacing Buses" | 08/942,882 | 12A | MNFRAME.0 |
| "Method for Interfacing Buses" | 08/942,413 | 13A | MNFRAME.0 |
| "Computer Fan Speed Control Device" | 08/942,447 | 16A | MNFRAME.0 |
| "Computer Fan Speed Control Method" | 08/942,216 | 17A | MNFRAME.0 |
| "System for Powering Up and Powering Down a Server" | 08/943,076 | 18A | MNFRAME.0 |
| "Method of Powering Up and Powering Down a Server" | 08/943,077 | 19A | MNFRAME.0 |
| "System for Resetting a Server" | 08/942,333 | 20A | MNFRAME.0 |
| "Method of Resetting a Server" | 08/942,405 | 21A | MNFRAME.0 |
| "System for Displaying Flight Recorder" | 08/942,070 | 22A | MNFRAME.0 |
| "Method of Displaying Flight Recorder" | 08/942,068 | 23A | MNFRAME.0 |
| "Synchronous Communication Interface" | 08/943,355 | 24A | MNFRAME.0 |
| "Synchronous Communication Emulation" | 08/942,004 | 25A | MNFRAME.0 |
| "Software System Facilitating the Replacement or Insertion of Devices in a Computer System" | 08/942,317 | 26A | MNFRAME.0 |
| "Method for Facilitating the Replacement or Insertion of Devices in a Computer System" | 08/942,316 | 27A | MNFRAME.0 |
| "System Management Graphical User Interface" | 08/943,357 | 28A | MNFRAME.0 |
| "Display of System Information" | 08/942,195 | 29A | MNFRAME.0 |
| "Data Management System Supporting Hot Plug Operations on a Computer" | 08/942,129 | 30A | MNFRAME.0 |
| "Data Management Method Supporting Hot Plug Operations on a Computer" | 08/942,124 | 31A | MNFRAME.0 |
| "Alert Configurator and Manager" | 08/942,005 | 32A | MNFRAME.0 |
| "Managing Computer System Alerts" | 08/943,356 | 33A | MNFRAME.0 |
| "Computer Fan Speed Control System" | 08/940,301 | 34A | MNFRAME.0 |
| "Computer Fan Speed Control System Method" | 08/941,267 | 35A | MNFRAME.0 |
| "Black Box Recorder for Information System Events" | 08/942,381 | 36A | MNFRAME.0 |
| "Method of Recording Information System Events" | 08/942,164 | 37A | MNFRAME.0 |
| "Method for Automatically Reporting a System Failure in a Server" | 08/942,168 | 40A | MNFRAME.0 |
| "System for Automatically Reporting a System Failure in a Server" | 08/942,384 | 41A | MNFRAME.0 |
| "Expansion of PCI Bus Loading Capacity" | 08/942,404 | 42A | MNFRAME.0 |
| "Method for Expanding PCI Bus Loading Capacity" | 08/942,223 | 43A | MNFRAME.0 |
| "System for Displaying System Status" | 08/942,347 | 44A | MNFRAME.0 |
| "Method of Displaying System Status" | 08/942,071 | 45A | MNFRAME.0 |
| "Fault Tolerant Computer System" | 08/942,194 | 46A | MNFRAME.0 |
| "Method for Hot Swapping of Network Components" | 08/943,044 | 47A | MNFRAME.0 |
| "A Method for Communicating a Software Generated Pulse Waveform Between Two Servers in a Network" | 08/942,221 | 48A | MNFRAME.0 |
| "A System for Communicating a Software Generated Pulse Waveform Between Two Servers in a Network" | 08/942,409 | 49A | MNFRAME.0 |
| "Method for Clustering Software Applications" | 08/942,318 | 50A | MNFRAME.0 |
| "System for Clustering Software Applications" | 08/942,411 | 51A | MNFRAME.0 |
| "Method for Automatically Configuring a Server after Hot Add of a Device" | 08/942,319 | 52A | MNFRAME.0 |
| "System for Automatically Configuring a Server after Hot Add of a Device" | 08/942,331 | 53A | MNFRAME.0 |
| "Method of Automatically Configuring and Formatting a Computer System and Installing Software" | 08/942,412 | 54A | MNFRAME.0 |
| "System for Automatically Configuring and Formatting a | 08/941,965 | 55A | MNFRAME.0 |

-continued

| Title | Application No. | At-torney | Docket No. |
|---|---|---|---|
| Computer System and Installing Software" | | | |
| "Determining Slot Numbers in a Computer" | 08/942,462 | 56A | MNFRAME.0 |
| "System for Detecting Errors in a Network" | 08/942,169 | 58A | MNFRAME.0 |
| "Method of Detecting Errors in a Network" | 08/940,302 | 59A | MNFRAME.0 |
| "System for Detecting Network Errors" | 08/942,407 | 60A | MNFRAME.0 |
| "Method of Detecting Network Errors" | 08/942,573 | 61A | MNFRAME.0 |

What is claimed is:

1. A fault-tolerant computer system with a processor and a memory, connected to a system bus, and said fault-tolerant computer system comprising:
a first input/output (IO) bus connected to the system bus;
a plurality of legacy devices connected to said first IO bus;
a second and a third IO bus each connected to the system bus;
at least two IO devices each connected to a corresponding one of said second and said third IO buses, said at least two IO devices providing redundant access to a common data and/or network; and load balancing means for balancing data transfers between said processor and said at least two IO devices.

2. The fault-tolerant computer system of claim 1, further comprising:
re-routing means for re-routing data transfers between said processor and an inaccessible one of said at least two IO devices to an other of said at least two IO devices.

3. The fault-tolerant computer system of claim 1, further comprising:
at least two bridge interface units each connected between a corresponding one of said at least two IO buses and said system bus.

4. The fault-tolerant computer system of claim 1, wherein further:
the at least two IO devices are redundant storage devices for storage of mirrored data.

5. The fault-tolerant computer system of claim 1, wherein further:
the at least two IO devices are redundant network interface devices for transferring data between the computer system and a network.

6. The fault-tolerant computer system of claim 4, further comprising:
mirroring means for mirroring write data transfers from said processor to said redundant storage devices.

7. The fault-tolerant computer system of claim 5, further comprising: Load balancing means for balancing data transfers between said processor and said redundant network interface devices.

8. A fault-tolerant computer system with a processor and a memory, connected to a system bus, said fault-tolerant computer system comprising:
at least two mirrored circuits, each with a system bus interface and an input/output (IO) interface, and each system bus interface connected to the system bus:
at least two mirrored IO devices each connected to a corresponding one of the IO interfaces, said IO devices being redundant network interface devices for transferring data between the computer system and a network:
a detection system capable of detecting a load imbalance in a data transfer between the system bus and one of said at least two mirrored IO devices;
a router configured to re-work the data transfer between said system bus and another of the at least two mirrored IO devices responsive to said detection system;
at least two incoming data protocol stacks, and each of said at least two incoming data protocol stacks adapted to contain a plurality of data packets from the network for processing; and
the memory device containing instructions that when executed transfer an incoming data packet to a selected one of said at least two incoming data protocol stacks to balance the processing.

9. A fault-tolerant computer system with a processor and a memory, connected to a system bus, said fault-tolerant computer system comprising:
at least two mirrored circuits each with a system bus interface and an input/output (IO) interface and each system bus interface connected to the system bus;
at least two mirrored IO devices each connected to a corresponding one of the IO interfaces, said IO devices being redundant network interface devices for transferring data between the computer system and a network;
a detector configured to detect a load imbalance in a data transfer between the system bus and one of said at least two mirrored IO devices;
a router configured to re-route the data transfer between said system bus and another of the at least two mirrored IO devices responsive to said detector;
at least two outgoing data protocol stacks, each of said at least two outgoing data protocol stacks adapted to contain a plurality of data packets destined for the network for processing; and
the memory device containing instructions that when executed transfer an outgoing data packet to a selected one of said at least two outgoing data protocol stacks to balance the processing.

10. A fault-tolerant computer system with a processor and a memory, connected to a system bus, and said fault-tolerant computer system comprising:
at least two mirrored circuits, each with a system bus interface connected to the system bus and an input/output (IO) interface;
at least two mirrored input/output (IO) devices each connected to a corresponding one of the IO interfaces;
a detection means for detecting a load imbalance between protocol stack pairs in a data transfer between the system bus and a one of said at least two mirrored IO devices;
a re-route means for re-routing the data transfer between said system bus and another of the at least two mirrored IO devices responsive to said detection means;
wherein the at least two mirrored IO devices are redundant network interface devices for transferring data between the computer system and a network; and
a failure detection means for detecting a load imbalance in a data transfer between the system bus and an inaccessible one of said at least two mirrored IO devices.

11. An apparatus for transferring data between at least one transport protocol stack and a plurality of network adaptors coupled to a computer network that supports recovery from network adapter and connection failure, comprising:

a first interface bound to the at least one transport protocol stack; and a second interface bound to the plurality of network adapters;

wherein the first interface is configured to receive a first MAC-level packet from a transport protocol stack and to forward the first packet through the second interface to a network adapter in the plurality of network adapters, and wherein the second interface is configured to receive a second packet from a network adapter in the plurality of network adapters and to forward the second packet through the first interface to a transport protocol; and a failure managing means for detecting a failed network adapter in the plurality of network adapters and for rerouting packets to a different network adapter in the plurality of network adapters, wherein said failure managing means operates in an operating system-independant manner.

12. The apparatus of claim 11, wherein said failed network adapter is a failed primary network adapter and said different network adapter is a secondary network adapter.

13. The apparatus of claim 11, further comprising:

load-sharing means for performing load sharing by selectively routing packets to network adapters in the plurality of network adapters.

14. The apparatus of claim 11, wherein the apparatus can function as an NDIS intermediate driver, wherein;

the first interface is configured to present a virtual adapter for binding to at least one protocol stack; and the second interface is configured to present a virtual transport protocol stack for binding to a network adapter in the plurality of network adapters.

15. The apparatus of claim 11, wherein all adapters in the plurality of adapters bound to the second interface are configured to the same physical address.

16. The apparatus of claim 11, wherein the apparatus is implemented at the MAC layer and below.

17. The apparatus of claim 11, wherein the apparatus can function as a prescan protocol stack for examining packets flowing between protocol stacks and drivers.

18. The apparatus of claim 11, wherein said failure managing means operates in a manner that is independent of network adapter hardware.

* * * * *